US012699896B2

(12) United States Patent
Mayer et al.

(10) Patent No.: US 12,699,896 B2
(45) Date of Patent: Aug. 4, 2026

(54) AUTOMATED AND ADAPTIVE DESIGN AND TRAINING OF NEURAL NETWORKS

(71) Applicant: DataRobot, Inc., Boston, MA (US)

(72) Inventors: Zachary Albert Mayer, Boston, MA (US); Jason McGhee, Boston, MA (US); Jesse Bannon, Boston, MA (US); Joshua Matthew Weiner, Boston, MA (US)

(73) Assignee: DataRobot, Inc., Boston, MA (US)

( * ) Notice: Subject to any disclaimer, the term of this patent is extended or adjusted under 35 U.S.C. 154(b) by 1028 days.

(21) Appl. No.: 17/744,284

(22) Filed: May 13, 2022

(65) Prior Publication Data

US 2023/0004796 A1 Jan. 5, 2023

Related U.S. Application Data

(63) Continuation of application No. 17/198,841, filed on Mar. 11, 2021, now Pat. No. 11,334,795.

(60) Provisional application No. 62/989,685, filed on Mar. 14, 2020.

(51) Int. Cl.

| | |
|---|---|
| ***G06N 20/00*** | (2019.01) |
| ***G06F 17/18*** | (2006.01) |
| ***G06N 3/04*** | (2023.01) |
| ***G06N 3/08*** | (2023.01) |

(52) U.S. Cl.
CPC ............... *G06N 3/08* (2013.01); *G06F 17/18* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2016/0224903 | A1 | 8/2016 | Talathi et al. |
| 2018/0357543 | A1 | 12/2018 | Brown et al. |
| 2019/0095794 | A1 | 3/2019 | Lopez et al. |
| 2019/0236487 | A1 | 8/2019 | Huang et al. |
| 2019/0392311 | A1 | 12/2019 | Liu et al. |

(Continued)

FOREIGN PATENT DOCUMENTS

| | | | | |
|---|---|---|---|---|
| CN | 105204333 A | * 12/2015 | ............. G05B 13/04 |
| EP | 1 192 595 B1 | 11/2005 | |

(Continued)

OTHER PUBLICATIONS

International Preliminary Report on Patentability on PCT Appl. Ser. No. PCT/US2021/021882 dated Sep. 29, 2022 (9 pages).

(Continued)

*Primary Examiner* — David R Vincent
(74) *Attorney, Agent, or Firm* — Greenberg Traurig, LLP; Andrew J. Tibbetts; Samuel S. Stone

(57) ABSTRACT

Systems and methods are described for developing and using neural network models. An example method of training a neural network includes: oscillating a learning rate while performing a preliminary training of a neural network; determining, based on the preliminary training, a number of training epochs to perform for a subsequent training session, and training the neural network using the determined number of training epochs. The systems and methods can be used to build neural network models that efficiently and accurately handle heterogeneous data.

20 Claims, 14 Drawing Sheets

(56) References Cited

U.S. PATENT DOCUMENTS

2021/0174246 A1 6/2021 Triplet
2021/0190360 A1* 6/2021 Lee .......................... F24F 8/00

FOREIGN PATENT DOCUMENTS

EP 3 441 912 A1 2/2019
WO WO-2019/035364 A1 2/2019
WO WO-2019/200410 A1 10/2019

OTHER PUBLICATIONS

Abadi, Martin et al., "TensorFlow: Large-Scale Machine Learning on Heterogeneous Distributed Systems," Cornell University Computer Science: Distributed, Parallel, and Cluster Computing, 2016, 19 pages.
Bishop, Christopher M., "Neural Networks for Pattern Recognition", Oxford University Press, 1995, 498 pages.
Brownlee, Jason, "A Gentle Introduction to Dropout for Regularizing Deep Neural Networks", Deep Learning Performance, Dec. 3, 2018, available at https://machinelearningmastery.com/dropout-for-regularizing-deep-neural-networks/.
Brownlee, Jason, "Loss and Loss Functions for Training Deep Learning Neural Networks", Deep Learning Performance, Jan. 28, 2019, available at https://machinelearningmastery.com/loss-and-loss-functions-for-training-deep-learning-neural-networks/.
Dahl, George E. et al., "Improving deep neural networks for LVCSR using rectified linear units and dropout", 2013 IEEE International Conference on Acoustics, Speech and Signal Processing, 2013, pp. 8609-8613.
Hinton, Geoffrey E. et al., "Improving neural networks by preventing co-adaptation of feature detectors", 2012, 18 pages.
International Search Report and Written Opinion on PCT Appl. Ser. No. PCT/US2021/021882 dated Jun. 29, 2021 (43 pages).
Ioffe, Sergey et al., "Batch Normalization: Accelerating Deep Network Training by Reducing Internal Covariate Shift", JMLR: Workshop and Conference Proceedings, No. 32, 2015, 11 pages.
Kingma, Diederik et al., "Adam: A Method for Stochastic Optimization", published as a conference paper at ICLR 2015, 15 pages.
Klambauer, Gunter et al., "Self-Normalizing Neural Networks", Sep. 7, 2017, 102 pages.
Le, Quoc V et al., "On Optimization Methods for Deep Learning", Proceedings of the 28th International Conference on Machine Learning, 2011, 8 pages.
Li, Hao et al., "Visualizing the Loss Landscape of Neural Nets", Advances in Neural Information Processing Systems 31, 2018, 18 pages.
Loshchilov, Ilya et al., "SGDR: Stochastic Gradient Descent with Warm Restarts", Cornell University, 2017, pp. 1-16.
Lu, Zhou et al., "The Expressive Power of Neural Networks: A View from the Width", Neural Information Processing Systems, 2017, 21 pages.
Marcus, Gary, "Deep Learning: A Critical Appraisal", Jan. 2, 2018, 27 pages.
Non-Final Office Action on U.S. Appl. No. 17/198,841 dated May 24, 2021 (7 pages).
Non-Final Office Action on U.S. Appl. No. 17/198,841 dated Oct. 5, 2021 (15 pages).
Notice of Allowance on U.S. Appl. No. 17/198,841 dated Jan. 21, 2022 (6 pages).
Pham, Hieu et al., "Efficient Neural Architecture Search via Parameter Sharing", Proceedings of Machine Learning Research, vol. No. 80, 10 pages.
Smith, Leslie N. et al., "Super-Convergence: Very Fast Training of Residual Networks Using Large Learning Rates", May 17, 2018, 18 pages.
Smith, Leslie N., "A disciplined approach to neural network hyper-parameters: Part 1—learning rate, batch size, momentum, and weigh decay", Apr. 24, 2018, 21 pages.
So, David R. et al., "The Evolved Transformer", Proceedings of the 36th International Conference on Machine Learning, May 17, 2019, 10 pages.
Tan, Mingxing et al., "EfficientNet: Rethinking Model Scaling for Convolutional Neural Networks" Proceedings of the 36th International Conference on Machine Learning, Sep. 11, 2020, 10 pages.
Yamada, Kazuki et al., "Adaptive Learning Rate Adjustment with Short-Term Pre-Training in Data-Parallel Deep Learning", 2018 IEEE International Workshop on Signal Processing Systems (SiPS), 2018, pp. 100-105.

* cited by examiner

AUTOMATED AND ADAPTIVE DESIGN AND TRAINING OF NEURAL NETWORKS

CROSS-REFERENCE TO RELATED APPLICATIONS

This application claims the benefit of priority under 35 U.S.C. § 120 as a continuation of U.S. patent application Ser. No. 17/198,841, filed Mar. 11, 2021, which claims the benefit of priority under 35 U.S.C. § 119 to U.S. Provisional Patent Application Ser. No. 62/989,685, entitled "AUTOMATED AND ADAPTIVE DESIGN AND TRAINING OF NEURAL NETWORKS," filed Mar. 14, 2020, the contents of all such applications being hereby incorporated by reference in their entirety and for all purposes as if completely and fully set forth herein.

TECHNICAL FIELD

This disclosure relates to computer-implemented methods and systems that automate the building, training, tuning, and interpretation of neural networks and other machine learning models.

BACKGROUND

Artificial neural networks ("neural networks") are a family of computer models inspired by biological neural networks and can be used to estimate or approximate functions from a large number of unknown inputs. Neural network models can be used for regression and/or classification. In one example involving classification, images of dogs can be collected and used to train a neural network model to recognize different dog breeds. When a new image of a dog is provided as input to the trained model, the model can provide a score indicating how closely the dog matches one or more of the breeds and/or can provide an identification of the breed. Neural networks can be used in self-driving cars, character recognition, image compression, stock market predictions, and other applications.

A neural network model is based on a collection of connected units or nodes called neurons or perceptrons. Connections between the nodes loosely resemble connections between neurons in a biological brain. For example, like the neurons and synapses in a biological brain, a neuron in a neural network model can receive and/or transmit signals (e.g., numerical values) to other neurons. The input to the neuron can be a real number and the output from the neuron can be the result of a linear or non-linear function applied to the neuron's inputs.

Neural network models, however, are generally not user-friendly, and the training, development, and interpretation of neural network models has traditionally been a manually intensive process. There is a need for improved systems and methods for training, using, and interpreting neural network models.

SUMMARY

Businesses and other entities regularly use machine learning and other computer models for analyzing data and making predictions. Many available machine learning models are incapable of handling large amounts of data and can provide poor results in such circumstances. Neural networks, on the other hand, are generally capable of handling large and often tortuous data sets; however, neural networks can require significant manual effort and can be highly complex and difficult to implement and use. Developing, training, and maintaining neural network models can require significant computational costs and manual effort.

Advantageously, the systems and methods described herein can significantly improve the development, implementation, and use of neural network models. For example, the systems and methods utilize a variety of approaches for efficiently pre-processing data (e.g., tabular training data, validation data, and/or prediction data) for use with neural networks. Such pre-processing techniques can reduce computation times required for training and making predictions, and can result in more efficient and accurate neural network models. The systems and methods also utilize techniques for designing and constructing neural network models, for example, to select appropriate model architectures, loss functions, and activation functions (e.g., output activation functions). Additional techniques are presented for determining appropriate values for hyperparameters, which can be used to control the neural network training process. For example, values for hyperparameters can be determined automatically based on one or more training data characteristics and/or on a type of modeling problem to be solved (e.g., regression or classification). Values for the hyperparameters can be adapted or adjusted during training according to one or more training schedules. Additional techniques are presented for automatically determining a suitable number of training epochs or iterations to use during the training process. The systems and methods also provide tools for preparing and presenting a variety of charts, tables, and graphs that can help users interpret and understand the training process and model predictions.

In general, one innovative aspect of the subject matter described in this specification can be embodied in a computer-implemented method of training a neural network. The method includes: oscillating a learning rate while performing a preliminary training of a neural network; determining, based on the preliminary training, a number of training epochs to perform for a subsequent training session; and training the neural network using the determined number of training epochs.

In certain examples, oscillating the learning rate can include oscillating the learning rate over successive training iterations (e.g., multiple iterations per oscillation cycle), and a single iteration can include training the neural network with a single mini-batch of training data. Oscillating the learning rate can include oscillating the learning rate between a minimum learning rate and a maximum learning rate. Oscillating the learning rate can include: determining that an accuracy of the neural network has not improved over a threshold number of oscillation cycles and, in response to the determination, decreasing the maximum learning rate and/or a difference between the maximum learning rate and the minimum learning rate. Each training epoch can include a full pass through a set of training data.

In some implementations, the training data can include tabular data and/or heterogeneous data. Determining the number of training epochs can include: monitoring a prediction accuracy of the neural network during the preliminary training; and determining the number of training epochs based on a rate of change of the prediction accuracy over successive training iterations. Training the neural network can include generating a learning rate schedule based on the determined number of epochs, and the learning rate schedule can define values for the learning rate over the determined number of training epochs. Training the neural network can include generating a momentum schedule based on the determined number of epochs, and the momentum schedule can define values for momentum over the determined number of training epochs. Training the neural network can include generating a training schedule for one or more hyperparameters based on the determined number of epochs, and the training rate schedule can define values for the one or more hyperparameters over the determined number of training epochs. The one or more hyperparameters can include learning rate, momentum, mini-batch size, dropout rate, regularization, an optimizer hyperparameter, a weight decay, a moment estimation, or any combination thereof.

In another aspect, the subject matter described in this specification can be embodied in a system having one or more computer systems programmed to perform operations including: oscillating a learning rate while performing a preliminary training of a neural network; determining, based on the preliminary training, a number of training epochs to perform for a subsequent training session; and training the neural network using the determined number of training epochs.

In various examples, oscillating the learning rate can include oscillating the learning rate over successive training iterations (e.g., multiple iterations per oscillation cycle), and a single iteration can include training the neural network with a single mini-batch of training data. Oscillating the learning rate can include oscillating the learning rate between a minimum learning rate and a maximum learning rate. Oscillating the learning rate can include: determining that an accuracy of the neural network has not improved over a threshold number of oscillation cycles and, in response to the determination, decreasing the maximum learning rate and/or a difference between the maximum learning rate and the minimum learning rate. Each training epoch can include a full pass through a set of training data.

In certain implementations, the training data can include tabular data and/or heterogeneous data. Determining the number of training epochs can include: monitoring a prediction accuracy of the neural network during the preliminary training; and determining the number of training epochs based on a rate of change of the prediction accuracy over successive training iterations. Training the neural network can include generating a learning rate schedule based on the determined number of epochs, and the learning rate schedule can define values for the learning rate over the determined number of training epochs. Training the neural network can include generating a momentum schedule based on the determined number of epochs, and the momentum schedule can define values for momentum over the determined number of training epochs. Training the neural network can include generating a training schedule for one or more hyperparameters based on the determined number of epochs, and the training rate schedule can define values for the one or more hyperparameters over the determined number of training epochs. The one or more hyperparameters can include learning rate, momentum, mini-batch size, dropout rate, regularization, an optimizer hyperparameter, a weight decay, a moment estimation, or any combination thereof.

In another aspect, the subject matter described in this specification can be embodied in a non-transitory computer-readable medium having instructions stored thereon that, when executed by one or more computer processors, cause the one or more computer processors to perform operations including: oscillating a learning rate while performing a preliminary training of a neural network; determining, based on the preliminary training, a number of training epochs to perform for a subsequent training session; and training the neural network using the determined number of training epochs.

In another aspect, the subject matter described in this specification can be embodied in a computer-implemented method of training a neural network. The method includes: providing a neural network and training data; determining, based on a size of the training data, one or more first hyperparameters including at least one of a mini-batch size or a dropout rate; determining, based on a type of predictive modeling problem to be solved using the neural network, one or more second hyperparameters including at least one of a learning rate, a batch normalization, a number of epochs, or an output activation function; and training the neural network using the training data, the one or more first hyperparameters, and the one or more second hyperparameters.

In certain examples, determining the one or more first hyperparameters includes determining the mini-batch size to be about 1% of the size of the training data. The training data can include a plurality of rows, and determining the one or more first hyperparameters can include determining the dropout rate to be greater than 5% when the number of rows is less than 2,000. Determining the one or more second hyperparameters can include determining the learning rate to be: (i) from 0.001 to 0.005 for regression problems involving text; (ii) from 0.005 to 0.025 for regression problems in which a loss function utilizes a Poisson distribution, a gamma distribution, or a Tweedie distribution; or (iii) between 0.01 and 0.05 for other types of predictive modeling problems. Determining the one or more second hyperparameters can include determining the batch normalization, and the batch normalization is not used unless the type of predictive modeling problem includes binary classification or a multiclass classification problem using a neural network architecture having more than one hidden layer.

In some instances, determining the one or more second hyperparameters can include determining the number of epochs, and the number of epochs can be determined to be from 2 to 4 when the type of predictive modeling problem is or includes regression and from 3 to 5 when the type of predictive modeling problem is or includes classification. Determining the one or more second hyperparameters can include determining the output activation function, and for regression problems the output activation function can be determined to be (i) an exponential function when the training data includes skewed targets and a loss function utilizes a Poisson distribution, a gamma distribution, or a Tweedie distribution or (ii) a linear function. Determining the one or more second hyperparameters can include determining the output activation function, and for classification problems the output activation function can be determined to be (i) a sigmoid function for binary classification problems or independent multiclass problems or (ii) a softmax function for mutually exclusive multiclass classification problems. Training the neural network can include: initiating the training using the one or more first hyperparameters and the one or more second hyperparameters; and adjusting at least one of the one or more first hyperparameters and the one or more second hyperparameters over successive training iterations.

In another aspect, the subject matter described in this specification can be embodied in a system having one or more computer systems programmed to perform operations including: providing a neural network and training data; determining, based on a size of the training data, one or more first hyperparameters including at least one of a mini-batch size or a dropout rate; determining, based on a type of predictive modeling problem to be solved using the neural network, one or more second hyperparameters including at least one of a learning rate, a batch normalization, a number of epochs, or an output activation function; and training the neural network using the training data, the one or more first hyperparameters, and the one or more second hyperparameters.

In certain examples, determining the one or more first hyperparameters includes determining the mini-batch size to be about 1% of the size of the training data. The training data can include a plurality of rows, and determining the one or more first hyperparameters can include determining the dropout rate to be greater than 5% when the number of rows is less than 2,000. Determining the one or more second hyperparameters can include determining the learning rate to be: (i) from 0.001 to 0.005 for regression problems involving text; (ii) from 0.005 to 0.025 for regression problems in which a loss function utilizes a Poisson distribution, a gamma distribution, or a Tweedie distribution; or (iii) between 0.01 and 0.05 for other types of predictive modeling problems. Determining the one or more second hyperparameters can include determining the batch normalization, and the batch normalization is not used unless the type of predictive modeling problem includes binary classification or a multiclass classification problem using a neural network architecture having more than one hidden layer.

In some instances, determining the one or more second hyperparameters can include determining the number of epochs, and the number of epochs can be determined to be from 2 to 4 when the type of predictive modeling problem is or includes regression and from 3 to 5 when the type of predictive modeling problem is or includes classification. Determining the one or more second hyperparameters can include determining the output activation function, and for regression problems the output activation function can be determined to be (i) an exponential function when the training data includes skewed targets and a loss function utilizes a Poisson distribution, a gamma distribution, or a Tweedie distribution or (ii) a linear function. Determining the one or more second hyperparameters can include determining the output activation function, and for classification problems the output activation function can be determined to be (i) a sigmoid function for binary classification problems or independent multiclass problems or (ii) a softmax function for mutually exclusive multiclass classification problems. Training the neural network can include: initiating the training using the one or more first hyperparameters and the one or more second hyperparameters; and adjusting at least one of the one or more first hyperparameters and the one or more second hyperparameters over successive training iterations.

In another aspect, the subject matter described in this specification can be embodied in a non-transitory computer-readable medium having instructions stored thereon that, when executed by one or more computer processors, cause the one or more computer processors to perform operations including: providing a neural network and training data; determining, based on a size of the training data, one or more first hyperparameters including at least one of a mini-batch size or a dropout rate; determining, based on a type of predictive modeling problem to be solved using the neural network, one or more second hyperparameters including at least one of a learning rate, a batch normalization, a number of epochs, or an output activation function; and training the neural network using the training data, the one or more first hyperparameters, and the one or more second hyperparameters.

In another aspect, the subject matter described in this specification can be embodied in a computer-implemented method of designing a neural network. The method includes: providing training data for a neural network; choosing, based on (i) a type of predictive modeling problem to be solved using the neural network and (ii) a distribution of a target variable in the training data, a loss function for the neural network; and choosing, based on the loss function, an output activation function for the neural network.

In various implementations, the type of predictive modeling problem can be or include regression, and choosing the loss function can includes: (i) choosing a Tweedie loss function when the target variable is zero-inflated; (ii) choosing a Poisson loss function when the distribution is or approximates a Poisson distribution; (iii) choosing a gamma loss function or a root mean squared log error (RMSLE) loss function when the distribution is or approximates an exponential distribution; or (iv) otherwise choosing a root mean squared error (RMSE) loss function. Additionally or alternatively, the type of predictive modeling problem can be or include classification, and choosing the loss function can include: (i) choosing a sparse categorical cross entropy loss function when the type of predictive modeling problem is a mutually exclusive multiclass classification problem or (ii) choosing a binary cross entropy loss function when the type of predictive modeling problem is a binary classification problem or an independent multiclass problem. Choosing the loss function can include displaying at least one recommended loss function on a client device of a user.

In some examples, choosing the output activation function can include (i) choosing an exponential output activation function when the loss function is logarithmic or (ii) otherwise choosing a linear output activation function. The loss function can be logarithmic when the loss function includes one of a Tweedie loss function, a gamma loss function, a Poisson loss function, or a root mean squared log error (RMSLE) loss function. Choosing the output activation function can include displaying at least one recommended output activation function on a client device of a user. The neural network can include an input layer, at least one hidden layer, and an output layer, and the method can include configuring the neural network to include a residual connection between the input layer and the output layer, the residual connection bypassing the at least one hidden layer and having a linear activation function. The neural network can include an output layer having an output activation function, and the method can include: initializing a bias for the output layer to be (i) equal to a mean of the target variable when the output activation function is linear or (ii) equal to a mean of an inverse of the output activation function. The method can include automatically scaling an output of the neural network based on a range of the target variable.

In another aspect, the subject matter described in this specification can be embodied in a system having one or more computer systems programmed to perform operations including: providing training data for a neural network; choosing, based on (i) a type of predictive modeling problem to be solved using the neural network and (ii) a distribution of a target variable in the training data, a loss function for the neural network; and choosing, based on the loss function, an output activation function for the neural network.

In various examples, the type of predictive modeling problem can be or include regression, and choosing the loss function can includes: (i) choosing a Tweedie loss function when the target variable is zero-inflated; (ii) choosing a Poisson loss function when the distribution is or approximates a Poisson distribution; (iii) choosing a gamma loss function or a root mean squared log error (RMSLE) loss function when the distribution is or approximates an exponential distribution; or (iv) otherwise choosing a root mean squared error (RMSE) loss function. Additionally or alternatively, the type of predictive modeling problem can be or include classification, and choosing the loss function can include: (i) choosing a sparse categorical cross entropy loss function when the type of predictive modeling problem is a mutually exclusive multiclass classification problem or (ii) choosing a binary cross entropy loss function when the type of predictive modeling problem is a binary classification problem or an independent multiclass problem. Choosing the loss function can include displaying at least one recommended loss function on a client device of a user.

In certain instances, choosing the output activation function can include (i) choosing an exponential output activation function when the loss function is logarithmic or (ii) otherwise choosing a linear output activation function. The loss function can be logarithmic when the loss function includes one of a Tweedie loss function, a gamma loss function, a Poisson loss function, or a root mean squared log error (RMSLE) loss function. Choosing the output activation function can include displaying at least one recommended output activation function on a client device of a user. The neural network can include an input layer, at least one hidden layer, and an output layer, and the operations can include configuring the neural network to include a residual connection between the input layer and the output layer, the residual connection bypassing the at least one hidden layer and having a linear activation function. The neural network can include an output layer having an output activation function, and the operations can include: initializing a bias for the output layer to be (i) equal to a mean of the target variable when the output activation function is linear or (ii) equal to a mean of an inverse of the output activation function. The operations can include automatically scaling an output of the neural network based on a range of the target variable.

In another aspect, the subject matter described in this specification can be embodied in a non-transitory computer-readable medium having instructions stored thereon that, when executed by one or more computer processors, cause the one or more computer processors to perform operations including: providing training data for a neural network; choosing, based on (i) a type of predictive modeling problem to be solved using the neural network and (ii) a distribution of a target variable in the training data, a loss function for the neural network; and choosing, based on the loss function, an output activation function for the neural network.

In another aspect, the subject matter described in this specification can be embodied in a computer-implemented method of training and using a neural network. The method includes: providing training data for a neural network, the training data including a column of numerical values; transforming the column of numerical values to obtain a column of transformed numerical values; creating a plurality of bins for the numerical values, each bin including a column of identifiers indicating whether respective values from the column of numerical values belong in the bin; and training the neural network using the column of transformed numerical values and the bins.

In some instances, the training data can include tabular data having a plurality of rows and columns. Transforming the column of numerical values can include performing a ridit transformation or a cumulative distribution function transformation. The transformed numerical values can fall within a specified numerical range. Each row of the column of transformed numerical values can correspond to a respective row of the column of numerical values. Each row of the column of identifiers can correspond to a respective row of the column of numerical values.

In certain implementations, creating the plurality of bins can include performing a one-hot encoding. Creating the plurality of bins can include using a decision tree to determine at least one numerical boundary for each bin. The method can include: determining that the training data includes one or more missing values for at least one variable; and replacing the one or more missing values with one or more new values based on other values for the at least one variable. The method can include: providing prediction data for the trained neural network, the prediction data including a second column of numerical values; transforming the second column of numerical values to obtain a second column of transformed numerical values; creating a plurality of second bins for the second column of numerical values, each second bin including a second column of identifiers indicating whether respective values from the second column of numerical values belong in the second bin; and making predictions using the neural network, the second column of transformed numerical values, and the second bins.

In another aspect, the subject matter described in this specification can be embodied in a system having one or more computer systems programmed to perform operations including: providing training data for a neural network, the training data including a column of numerical values; transforming the column of numerical values to obtain a column of transformed numerical values; creating a plurality of bins for the numerical values, each bin including a column of identifiers indicating whether respective values from the column of numerical values belong in the bin; and training the neural network using the column of transformed numerical values and the bins.

In some examples, the training data can include tabular data having a plurality of rows and columns. Transforming the column of numerical values can include performing a ridit transformation or a cumulative distribution function transformation. The transformed numerical values can fall within a specified numerical range. Each row of the column of transformed numerical values can correspond to a respective row of the column of numerical values. Each row of the column of identifiers can correspond to a respective row of the column of numerical values.

In various implementations, creating the plurality of bins can include performing a one-hot encoding. Creating the plurality of bins can include using a decision tree to determine at least one numerical boundary for each bin. The operations can include: determining that the training data includes one or more missing values for at least one variable; and replacing the one or more missing values with one or more new values based on other values for the at least one variable. The operations can include: providing prediction data for the trained neural network, the prediction data including a second column of numerical values; transforming the second column of numerical values to obtain a second column of transformed numerical values; creating a plurality of second bins for the second column of numerical values, each second bin including a second column of identifiers indicating whether respective values from the second column of numerical values belong in the second bin; and making predictions using the neural network, the second column of transformed numerical values, and the second bins.

In another aspect, the subject matter described in this specification can be embodied in a non-transitory computer-readable medium having instructions stored thereon that, when executed by one or more computer processors, cause the one or more computer processors to perform operations including: providing training data for a neural network, the training data including a column of numerical values; transforming the column of numerical values to obtain a column of transformed numerical values; creating a plurality of bins for the numerical values, each bin including a column of identifiers indicating whether respective values from the column of numerical values belong in the bin; and training the neural network using the column of transformed numerical values and the bins.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is provided below.

DETAILED DESCRIPTION

Figure 1:
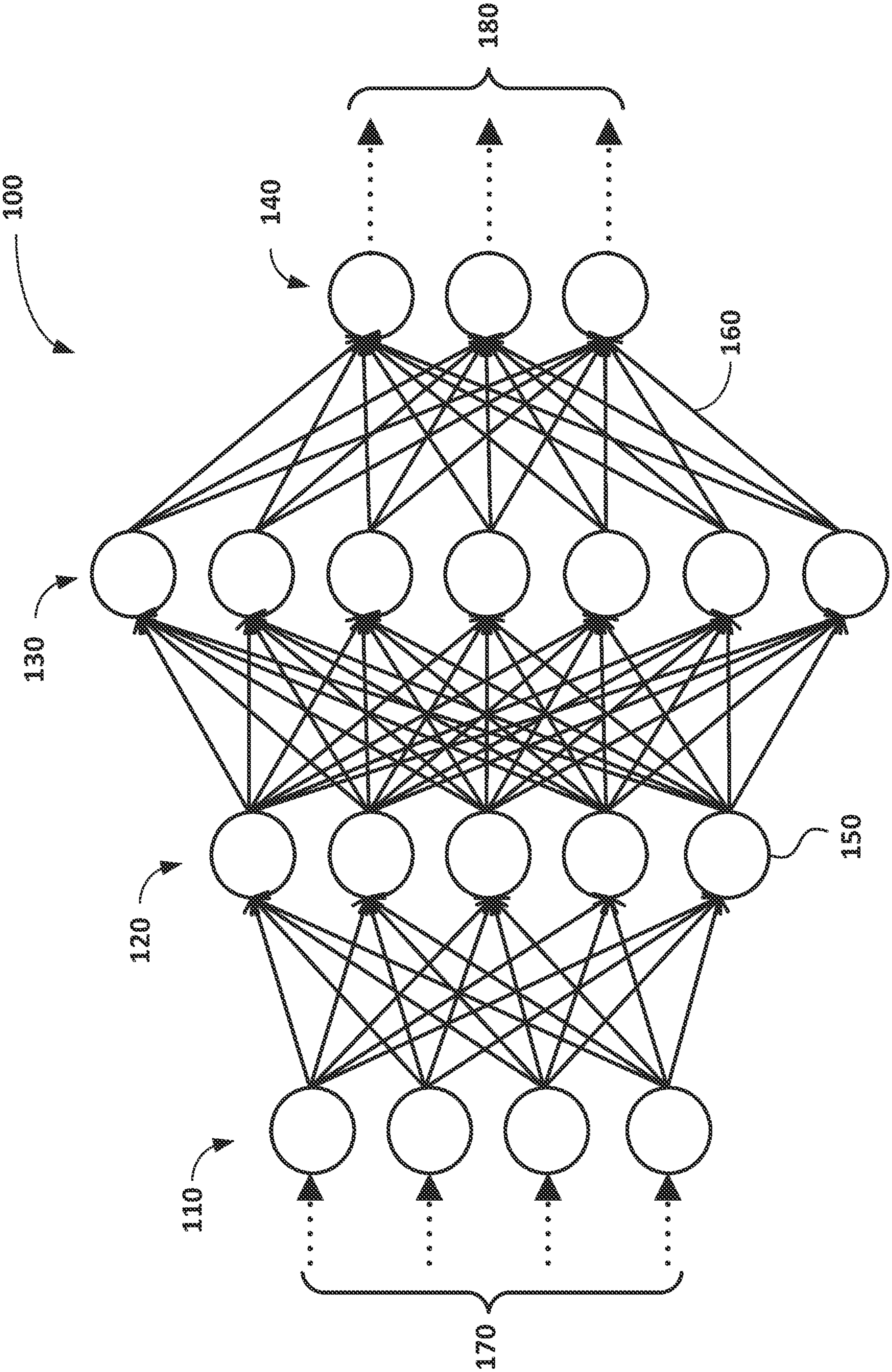
FIG. 1 is a schematic diagram of a neural network model, in accordance with certain embodiments.

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein, "data analytics" may refer to the process of analyzing data (e.g., using machine learning models or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

"Machine learning" generally refers to the application of certain techniques (e.g., pattern recognition and/or statistical inference techniques) by computer systems to perform specific tasks. Machine learning techniques (automated or otherwise) may be used to build data analytics models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. For example, a feature can be the price of a house. As a further example, a feature can be a shape extracted from an image of the house. In some cases, a feature of a data sample is a description of (or other information regarding) an entity represented by or associated with the data sample. A value of a feature may be a measurement of the corresponding property of an entity or an instance of information regarding an entity. For instance, in the above example in which a feature is the price of a house, a value of the 'price' feature can be $215,000. In some cases, a value of a feature can indicate a missing value (e.g., no value). For instance, in the above example in which a feature is the price of a house, the value of the feature may be 'NULL', indicating that the price of the house is missing.

Features can also have data types. For instance, a feature can have an image data type, a numerical data type, a text data type (e.g., a structured text data type or an unstructured ("free") text data type), a categorical data type, or any other suitable data type. In the above example, the feature of a shape extracted from an image of the house can be of an image data type. In general, a feature's data type is categorical if the set of values that can be assigned to the feature is finite.

As used herein, "image data" may refer to a sequence of digital images (e.g., video), a set of digital images, a single digital image, and/or one or more portions of any of the foregoing. A digital image may include an organized set of picture elements ("pixels"). Digital images may be stored in computer-readable file. Any suitable format and type of digital image file may be used, including but not limited to raster formats (e.g., TIFF, JPEG, GIF, PNG, BMP, etc.), vector formats (e.g., CGM, SVG, etc.), compound formats (e.g., EPS, PDF, PostScript, etc.), and/or stereo formats (e.g., MPO, PNS, JPS, etc.).

As used herein, "non-image data" may refer to any type of data other than image data, including but not limited to structured textual data, unstructured textual data, categorical data, and/or numerical data. As used herein, "natural language data" may refer to speech signals representing natural language, text (e.g., unstructured text) representing natural language, and/or data derived therefrom. As used herein, "speech data" may refer to speech signals (e.g., audio signals) representing speech, text (e.g., unstructured text) representing speech, and/or data derived therefrom. As used herein, "auditory data" may refer to audio signals representing sound and/or data derived therefrom.

As used herein, "time-series data" may refer to data collected at different points in time. For example, in a time-series data set, each data sample may include the values of one or more variables sampled at a particular time. In some embodiments, the times corresponding to the data samples are stored within the data samples (e.g., as variable values) or stored as metadata associated with the data set. In some embodiments, the data samples within a time-series data set are ordered chronologically. In some embodiments, the time intervals between successive data samples in a chronologically-ordered time-series data set are substantially uniform.

Time-series data may be useful for tracking and inferring changes in the data set over time. In some cases, a time-series data analytics model (or "time-series model") may be trained and used to predict the values of a target Z at time t and optionally times t+1, . . . , t+i, given observations of Z at times before t and optionally observations of other predictor variables P at times before t. For time-series data analytics problems, the objective is generally to predict future values of the target(s) as a function of prior observations of all features, including the targets themselves.

As used herein, "spatial data" may refer to data relating to the location, shape, and/or geometry of one or more spatial objects. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment).

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

Data (e.g., variables, features, etc.) having certain data types, including data of the numerical, categorical, or time-series data types, are generally organized in tables for processing by machine-learning tools. Data having such data types may be referred to collectively herein as "tabular data" (or "tabular variables," "tabular features," etc.). Data of other data types, including data of the image, textual (structured or unstructured), natural language, speech, auditory, or spatial data types, may be referred to collectively herein as "non-tabular data" (or "non-tabular variables," "non-tabular features," etc.).

As used herein, "data analytics model" may refer to any suitable model artifact generated by the process of using a machine learning algorithm to fit a model to a specific training data set. The terms "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), high-level (e.g., objects, scenes, events, etc.), or highest-level. The lower level features tend to be simpler and more generic (or broadly applicable), whereas the higher level features to be complex and task-specific. The detection/segmentation function may involve selection of a subset of the input image data (e.g., one or more images within a set of images, one or more regions within an image, etc.) for further processing. Models that perform image feature extraction (or image pre-processing and image feature extraction) may be referred to herein as "image feature extraction models."

Collectively, the features extracted and/or derived from an image may be referred to herein as a "set of image features" (or "aggregate image feature"), and each individual element of that set (or aggregation) may be referred to as a "constituent image feature." For example, the set of image features extracted from an image may include (1) a set of constituent image feature indicating the colors of the individual pixels in the image, (2) a set of constituent image features indicating where edges are present in the image, and (3) a set of constituent image features indicating where faces are present in the image.

As used herein, a "modeling blueprint" (or "blueprint") refers to a computer-executable set of pre-processing operations, model-building operations, and postprocessing operations to be performed to develop a model based on the input data. Blueprints may be generated "on-the-fly" based on any suitable information including, without limitation, the size of the user data, features types, feature distributions, etc. Blueprints may be capable of jointly using multiple (e.g., all) data types, thereby allowing the model to learn the associations between image features, as well as between image and non-image features.

In various examples, a "hyperparameter" can be or include a parameter that defines or controls a training process for a neural network or other machine learning model. Hyperparameters can be constant or can be adjusted over time (e.g., according to a schedule) during the training process. Examples of hyperparameters can include or relate to, for example, a mini-batch size, a dropout rate (or other regularization hyperparameter), a learning rate, a batch normalization (e.g., indicating whether or not batch normalization is used), a number of epochs, an output activation function, a momentum (e.g., one or more coefficients describing momentum), an optimizer, a weight decay, or any combination thereof.

In various examples, neural network "regularization" can refer to a process of modifying a learning algorithm such that the model generalizes better, in contrast to overfitting the network to the training data. Certain hyperparameters can be used to implement or achieve regularization. For example, in some instances, regularization can be achieved by increasing learning rate, decreasing batch size, increasing weight decay, running fewer epochs, reducing network capacity, increasing dropout, or any combination thereof.

FIG. 1 is a schematic diagram of an exemplary neural network 100, in accordance with certain examples. The neural network 100 can include an input layer 110, a first hidden layer 120, a second hidden layer 130, and an output layer 140. Each of these layers can further include neurons or nodes 150 connected to other nodes from adjacent layers via connections 160 (also referred to as "edges"). It is noted that neural network 100 is not limited to the depicted structure and can have fewer or additional layers, nodes, and/or connections. In some embodiments, each node 150 can be connected, via connections 160, to each node in a previous layer and/or to each node in a subsequent layer. For example, each node in layer 120 can be connected to each node in layer 110 and/or to each node in layer 130, as depicted.

As shown in FIG. 1, input data 170 (e.g., training data, validation data, and/or prediction data) can be introduced to the neural network 100 at the input layer 110, and each subsequent layer can receive information (e.g., numerical values) from preceding layers until the neural network provides predictions or results 180 at the output layer 140. The input data 170 can be or include original or raw data (e.g., tabular data) or data that has been pre-processed, as described herein. Data pre-processing can involve various data processing operations including, for example, reformatting, joining, appending, scaling, aggregating, binning, concatenating, or any combination therefor. The results 180 can be used to prepare graphs, charts, and/or tables that enable users to more easily interpret and understand the results 180.

In various examples, each edge or connection 160 in the neural network 100 can be associated with a weight and/or bias that can be tuned during a neural network training process, which can enable the model to "learn" to recognize patterns that may be present in the input data 170. In general, a weight for a connection 160 between two neurons can increase or decrease a "strength" (e.g., a contribution) for the connection 160. The weights can control how sensitive the network's predictions are to various features included in the input data 170. In various examples, neurons can have an activation function that controls how signals or values are sent to other connected neurons. For example, the activation function can require a threshold value to be exceeded before a signal or value can be sent. In general, the activation function of a node can define a range for the output of the node, for a given input or set of inputs.

Multiple connection patterns are possible between two adjacent layers in the neural network 100. For example, the two layers can be fully connected with each neuron in one layer connected to each neuron in the other layer, as depicted. Each layer may perform different transformations on its input. Signals or values can travel from the input layer 110 to the output layer 140 after traversing through any intermediate layers, which can be referred to as "hidden layers" (e.g., the first hidden layer 120 and the second hidden layer 130). Alternatively or additionally, a neural network with no hidden layers can be equivalent to a logistic or linear regression model, depending on the activation function used (e.g., sigmoid activation or linear activation).

Adding a hidden layer (e.g., a set of neurons followed by an activation function) can introduce non-linearity, which can allow the neural network model to learn non-linear relationships between features and/or can lead to significantly more powerful models.

According to some embodiments, the neural network 100 can be trained using a set of training data (e.g., a subset of the input data 170) that includes one or more features and one or more actual values that can be compared with model predictions. The training process can be a challenging task (e.g., involving use of an optimizer and back-propagation) that requires a methodical approach and includes several complex operations. For example, the training processes can repeatedly take a small batch of data (e.g., a mini-batch of training data), calculate a difference between predictions and actuals, and adjust weights (e.g., parameters within a neural network that transform input data within each of the network's hidden layers) in the model by a small amount, layer by layer, to generate predictions closer to actual values. Neural network models are flexible and allow for inclusion or composition of arbitrary functions. A universal approximation theorem states that feed-forward networks with a finite number of neurons (also referred to as "width") can approximate any continuous function and can do so with a single-layer. For example, networks using a rectified linear activation function (ReLU) can approximate any continuous function with n-dimensional input variables using a single hidden layer of width (e.g., number of neurons) n+4.

According to some embodiments, the training process described herein can utilize or include one or more of the following high-level operations: (i) input data pre-processing, (ii) model construction, (iii) initial hyperparameter determination, (iv) adaptive hyperparameter tuning, and (v) model interpretation. Each of the above operations, when not performed or when performed improperly can result in a poorly developed neural network model that does not fit data properly and/or provides erroneous or misleading predictions. While neural network training and interpretation has traditionally been a manually intensive process, certain embodiments of this disclosure can be used to automate the above operations. Such automation can provide substantial design flexibility, reduce the cost and time associated with model development, and produce a trained neural network model that is accurate and easy for end users to interpret.

Figure 2:
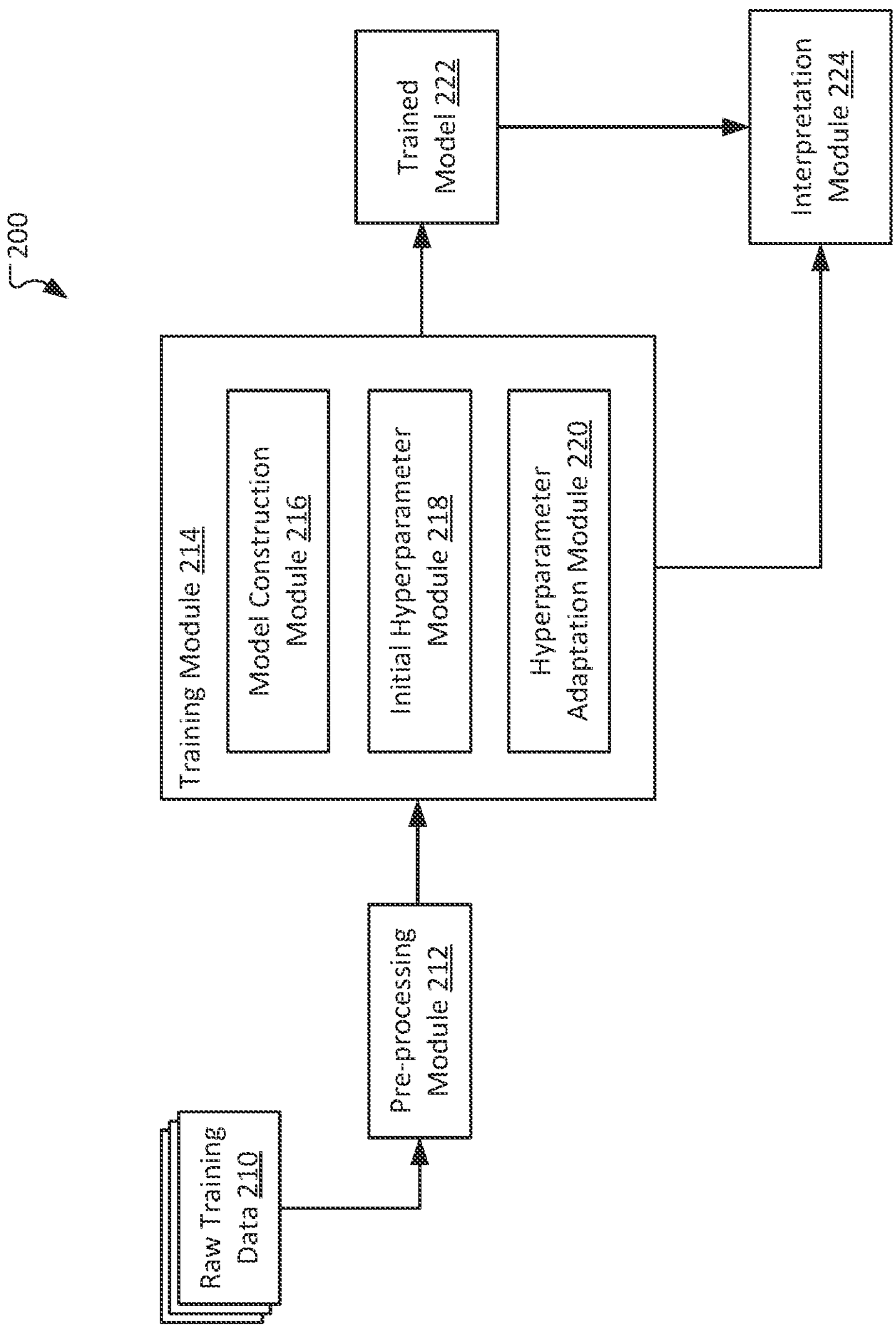
FIG. 2 is a schematic diagram of a system for developing and/or training a neural network model, in accordance with certain embodiments.

For example, FIG. 2 is a block diagram of a system 200 for developing and training neural networks or other machine learning models, according to some embodiments. Raw training data 210 (e.g., tabular data having rows and columns) is provided to a pre-processing module 212. The pre-processing module 212 can perform one or more data processing operations on the raw training data 210 to generate a processed training data, which is provided to a training module 214. The training module 214 includes a model construction module 216, an initial hyperparameter module 218, and a hyperparameter adaptation module 220. The model construction module 216 receives training data (e.g., as processed by the pre-processing module 212) and determines an appropriate model architecture for the model, based on the training data. The model construction module 216 can then construct the model according to the determined architecture, which can include, for example, a specified number of layers in the model, a specified number of neurons in each layer, a specified activation function for one or more layers, or other model characteristics. The initial hyperparameter module 218 can receive the training data and determine an appropriate initial set of hyperparameters and/or values for the hyperparameters that can be used to train the model. The hyperparameter adaptation module 220 can adapt or adjust one or more of hyperparameter values during the training process. For example, the hyperparameter adaptation module 220 can determine a suitable number of training iterations or epochs and/or can construct and implement one or more training schedules for the hyperparameters.

In general, the training module 214 can perform a training process in which model prediction errors are reduced by adjusting one or more parameters (e.g., weights and/or biases) for the model. The training process can involve, for example performing a series of iterations in which (i) the training data is provided to the model, (ii) predictions are made based on the training data, (iii) errors between the predictions and actual values are determined, and (iv) the model is adjusted in an effort to reduce the errors. In some instances, the model is trained using mini-batches or subsets of the training data. For example, a mini-batch of training data can be provided to the model and the model can be adjusted based on the determined errors.

Using a single mini-batch of training data to adjust the model in this manner can be referred to herein as an "iteration." A number of iterations required to make one pass through the training data can be equal to a number of mini-batches in the training data. For example, if the training data includes 200 mini-batches, then it can take 200 iterations to make a single pass through the training data. In some examples, an "epoch" refers to a single pass through all the training data and/or all the mini-batches in the training data. In a typical example, multiple passes are made through the training data, such that the model is trained over multiple epochs. For example, if the model is trained over 5 epochs and there are 200 mini-batches in the training data, then training can include a total of 1000 iterations (e.g., 5 training data passes×200 iterations per training data pass=1000 iterations).

Once the training process has been completed, the training module 214 can provide a trained model 222, which can be used to make predictions on other data (e.g., prediction data or validation data that has been pre-processed by the pre-processing module 212). Output from the trained model 222 can be provided to an interpretation module 224, which can generate one or more tables, charts, and/or graphs that a user can access to interpret the trained model 222. Additionally or alternatively, the interpretation module 224 can receive model predictions and/or training information from the training module 214. The interpretation module 224 can use this information to generate one or more tables, charts, and/or graphs that provide a user with information related to the model training process. The pre-processing module 212, the training module 214, the model construction module 216, the initial hyperparameter module 218, the hyperparameter adaptation module 220, the interpretation module 224, and the operations performed by these modules are described in more detail below.

Data Pre-Processing

Data pre-processing for neural network models can be particularly challenging and/or lead to model performance issues when performed manually or improperly. For example, improperly pre-processing input data can have a detrimental effect on the overall accuracy/loss of the predictive model. On the other hand, proper data pre-processing can require deep understanding of the data, which can be a time-consuming task. Advantageously, the systems and methods described herein are able to automate the data pre-processing in a manner that can significantly improve training efficiency and model accuracy, and can greatly simply the user experience.

Still referring to FIG. 2, pre-processing of training data 220 can occur in the pre-processing module 212 where training data 210 can be appropriately processed and/or reformatted before being sent to the training module 214. In some embodiments, one or more automatic pre-processing techniques can be used to pre-process the training data 210 and/or can depend on the type of data and/or values present in the training data 210. The one or more automatic pre-processing techniques can be or include, for example, (i) Ridit scoring, (ii) one-hot encoding, (iii) binning, (iv) automatic numeric imputation, (v) sparse pre-processing, (vi) concatenation, (vii) image featurization, (viii) text pre-processing (e.g., TFIDF or term-frequency inverse-document-frequency), other data processing techniques, or any combination thereof. In some instances, for example, it can be helpful to concatenate results or columns obtained from binning or one-hot encoding with results or columns obtained from Ridit scoring or other transformation (e.g., obtained with a cumulative distribution function). Automatic pre-processing may include ensuring some or all numeric data for one or more features is on a specified scale (e.g., 0 to 1 or −1 to 1), imputing missing values, concatenating alternative representations of numerics to the data, and/or leveraging TFIDF for text. The pre-processing techniques described herein can improve convergence in terms of speed and stability.

In general, Ridit scoring is a statistical method for analyzing ordered data or measurements. The Ridit score can be or include, for example, a percentile rank of an item in a reference population. In some embodiments, Ridit scoring can treat each numeric value of a distribution as a probability. Each numeric value can be transformed to a value on an interval (e.g., from 0 to 1), so that the transformed population of values maintains the distribution of the original values. Table 1 presents an example of Ridit scores generated for a single column variable A having values 17, 54, 60, 19, 9, 6, and 14. Ridit scoring and/or an empirical cumulative distribution function can be used to transform values to an interval from 0 to 1, from −1 to 1, or to some other suitable interval.

TABLE 1

Ridit transformation example.

| Original Dataset A | Ridit Score A_RDT |
|---|---|
| 17 | 0.04748603 |
| 54 | 0.24581006 |
| 60 | 0.56424581 |
| 19 | 0.7849162 |
| 9 | 0.86312849 |
| 6 | 0.90502793 |
| 14 | 0.96089385 |

In various examples, one-hot encoding can be appropriate for converting categorical variables into a numerical form represented by zeros and ones. For example, one-hot encoding can convert a single column having a cardinality of N to N new columns. Each new column can correspond to one of the categories from the original column and can include ones and zeros according to values in the original column. For example, if a column corresponds to category B, then the column can have a value of 1 in each row where the original column has a value of B, and all other elements in the column can be 0. Table 2 below shows an example of a simple one-hot encoding of a column having 7 values.

TABLE 2

One-hot encoding example.

| Original Dataset | One-Hot Encoding | | | | | | |
|---|---|---|---|---|---|---|---|
| A | A_17 | A_54 | A_60 | A_19 | A_9 | A_6 | A_14 |
| 17 | 1 | 0 | 0 | 0 | 0 | 0 | 0 |
| 54 | 0 | 1 | 0 | 0 | 0 | 0 | 0 |
| 60 | 0 | 0 | 1 | 0 | 0 | 0 | 0 |
| 19 | 0 | 0 | 0 | 1 | 0 | 0 | 0 |
| 9 | 0 | 0 | 0 | 0 | 1 | 0 | 0 |
| 6 | 0 | 0 | 0 | 0 | 0 | 1 | 0 |
| 14 | 0 | 0 | 0 | 0 | 0 | 0 | 1 |

In some examples, a maximum cardinality M can be specified for one-hot encoding. For example, when a cardinality N for a column exceeds the maximum cardinality M, M+1 new columns can be created, with M columns representing the M most frequent categories in the column and one additional column representing all remaining, less frequent categories. The most frequent categories in the original column can be represented by ones in the M columns and the less frequent categories can be represented by ones in the one additional column.

In some embodiments, the one-hot encoding can be concatenated with the Ridit scoring. For example, the columns in Tables 1 and 2 above can be combined as shown in Table 3 below. Concatenation in this case involves combining two or more columns into a set of columns that includes the two or more columns. Such concatenation may not include combining one more elements from two or more columns into a single column. The resulting concatenation of columns can be used as input to a neural network model (e.g., for training and/or making predictions). For example, each column can be assigned to a respective neuron in an input layer of the neural network model.

TABLE 3

Example of concatenation of one-hot encoding and Ridit transformation

| Original | Ridit Score Concatenated with One-Hot Encoding | | | | | | | |
|---|---|---|---|---|---|---|---|---|
| Dataset | Ridit Score | One-Hot Encoding | | | | | | |
| A | A_RDT | A_17 | A_54 | A_60 | A_19 | A_9 | A_6 | A_14 |
| 17 | 0.04748603 | 1 | 0 | 0 | 0 | 0 | 0 | 0 |
| 54 | 0.24581006 | 0 | 1 | 0 | 0 | 0 | 0 | 0 |
| 60 | 0.56424581 | 0 | 0 | 1 | 0 | 0 | 0 | 0 |
| 19 | 0.7849162 | 0 | 0 | 0 | 1 | 0 | 0 | 0 |
| 9 | 0.86312849 | 0 | 0 | 0 | 0 | 1 | 0 | 0 |
| 6 | 0.90502793 | 0 | 0 | 0 | 0 | 0 | 1 | 0 |
| 14 | 0.96089385 | 0 | 0 | 0 | 0 | 0 | 0 | 1 |

In some embodiments, the training data 220 can be binned, instead of or in addition to being one-hot encoded. Binning can refer to a transformation of continuous variables into discrete variables by creating a set of contiguous intervals (e.g., bins) spanning over a range of values. In some embodiments, binning can help manage outliers by placing the outliers into lower or higher bins or intervals, along with inlier values of the distribution. With this approach, outlier values may no longer differ from other values at tail ends of the distribution, as such values can all be grouped together in the same bin. Additionally or alternatively, the creation of appropriate bins can help spread values of a skewed variable across the bins, with each bin having a substantially equal number of observations.

In some embodiments, binning can involve using a decision tree and setting a maximum number of leaves to be a maximum number of desired bins. The decision tree can be fit using training data and training labels. During this process, a tree can be created that repeatedly makes decisions or splits the data according to one or more thresholds. The thresholds can be determined by picking points for subsets of the data that best satisfy some criterion, such as maximizing an information gain or a Gini impurity. The decision tree can be used to define appropriate boundaries for each bin, by sorting the thresholds and treating each as a boundary of a bin. Once the threshold values are determined, numerical values in one or more columns can be added to the bins. In one example, four bins can be generated such that: a first bin can have a threshold of less than or equal to 0 (e.g., ≤0); a second bin can have threshold values of greater than 0 and less than or equal to 1 (e.g., (0, 1]); a third bin can have threshold values greater than 1 and less than or equal to 4.5 (e.g., (1, 4.5]); and a fourth bin can have a threshold of greater than 4.5 (e.g., >4.5). Each bin can then be represented by a new column having zeros and one, indicating whether a value in a row falls within the bin. For example, like one-hot encoding described above, the row of a bin column can have a value of 0 when a respective value in the original column falls outside the bin and a value of 1 when the respective value falls within the bin. As another example, if the original column has a row with a value of 3, then the row across all four bins described above can be [0, 0, 1, 0], to indicate that the value falls within the third bin.

In certain examples, new columns representing bins can be concatenated with one or more other columns. For example, the binning approach described herein can be used to transform a column of training data into a plurality of new bin columns, one column for each bin. A Ridit transformation can also be performed on the column of training data to generate a new column of Ridit transformation values. The plurality of bin columns can then be concatenated with the column of Ridit transformation values, and the resulting combination of columns can be used as input to a neural network model (e.g., for training and/or making predictions).

According to some embodiments, automatic numeric imputation can involve a process in which missing data (e.g., no data in one or more rows of a column) is replaced with substituted values. The substituted values for a column can be based on other values in the column. For example, the substituted values can be or include, for example, a median value for the column, an average value for the column, a minimum value for the column, a maximum value for the column, a most common value for the column, or some other suitable value.

Finally, sparse pre-processing techniques can be used to handle data sets that are sparse (e.g., with many zeros and few non-zero values). Such techniques can involve, for example, representing the sparse data with an alternate data structure. Additionally or alternatively, zero values in a sparse data set can be ignored such that only non-zero values in the sparse matrix are stored or acted upon.

Text data can be pre-processed using various methods that convert the text into numerical representations of the text. For example, categorical text data can be processed using one-hot encoding. Term frequency-inverse document frequency (TF-IDF) methods can be used to assign each word a weight that represents an importance of the word. Additionally or alternatively, bag-of-words (BoW) and/or bag-of-characters techniques can be used to extract features from text.

In various examples, the pre-processed data (e.g., training data, validation data, and/or prediction data) can be provided to a neural network model at an input layer. Each neuron/perceptron in the model can be, in effect, a linear model, and outputs from the neurons can be sent through a non-linearity (e.g., a non-linear activation function), such as ReLU. All inputs at the input layer can be multiplied by weights and added to a bias of each neuron in a next layer (e.g., a first hidden layer). For example, each neuron in one layer can receive all neuron output of a previous layer, such that each neuron in the first hidden layer can receive all input data. Alternatively or additionally, in a neural network regressor, which has no hidden layers, there can be a single neuron in the output layer that receives all input data, performs a matrix multiplication with learned weights, adds the learned bias, and then outputs a prediction or value.

Advantageously, the pre-processing techniques described herein can significantly improve the training and overall performance of neural network models. In various examples, performing the binning techniques (and/or one-hot encoding techniques) described herein improved training efficiency (e.g., computation times) and/or model accuracy by a factor of 2, 5, 10, or more. For example, the pre-processing and/or training techniques (e.g., use of training schedules) described herein can enable neural networks to converge much more quickly during training, such that training can be performed using CPUs. By comparison, previous approaches for training neural networks have generally required the use of GPUs.

Further, when combined with an adaptive training schedule, as described herein, binning and/or one-hot encoding can allow neural networks to converge to functions that describe discontinuous (e.g., piece-wise) target functions or target functions having discontinuities. Traditional or previous neural networks have been limited to learning continuous functions and have had little or no success learning discontinuous functions. The pre-processing techniques described can make it possible for neural networks to be used efficiently and accurately for discontinuous targets or target functions.

Additionally or alternatively, the pre-processing techniques and/or training techniques described herein can make neural networks suitable for use with data that is tabular and/or heterogenous. The techniques can be particularly applicable to tabular data (e.g., numeric, categorical, and/or textual data) and flexible enough to allow neural networks to be applied to multiple data types at once. By comparison, previous neural network approaches have been suitable only for non-tabular and/or homogeneous data related to images, video, audio, or natural language processing.

Figure 3:
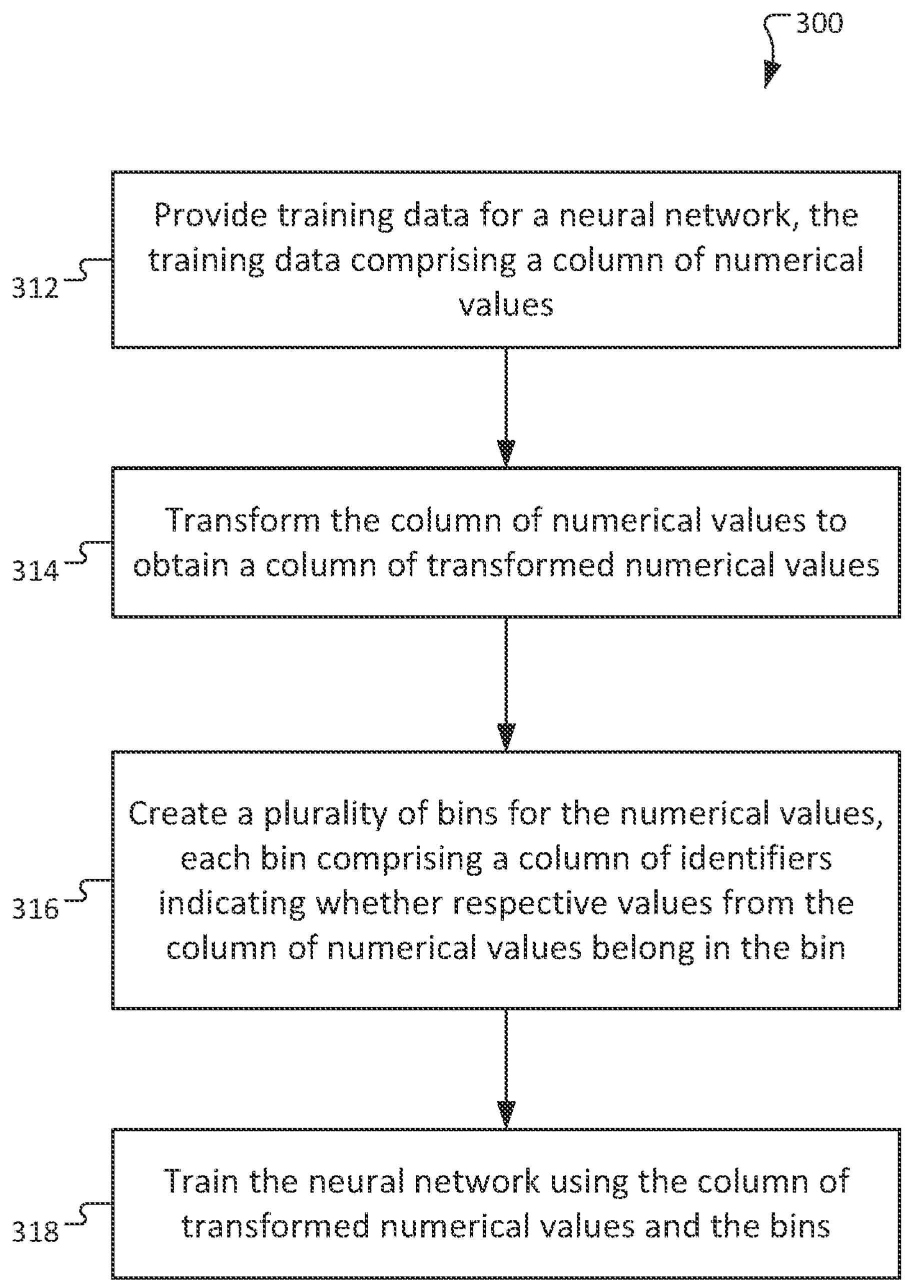
FIG. 3 is a flowchart of a method of training and using a neural network, in accordance with certain embodiments.

FIG. 3 is a flowchart of a method 300 of training and using a neural network. Training data for a neural network is provided (step 312) that includes a column of numerical values. The column of numerical values is transformed (step 314) to obtain a column of transformed numerical values. A plurality of bins for the numerical values is created (step 316). Each bin is or includes a column of identifiers indicating whether respective values from the column of numerical values belong in the bin. The neural network is trained (step 318) using the column of transformed numerical values and the bins.

Automatic Model Design and Construction

Previous approaches to designing and building neural network models are manually intensive and require significant time and experience. For example, designing and building the right model can involve manually choosing and implementing custom functions, such as loss functions, activation functions, and/or custom pre-processing functions. Users may incorrectly connect layers, improperly build custom functions, mislabel variables of the neural network, or fail to pay attention to the correct variables. Advantageously, the systems and methods described herein can automate the design and construction of neural network models, so that more efficient and accurate models can be generated with less time and expertise required.

Referring again to FIG. 2, in certain examples, the model construction module 216 can be used to automatically design and construct a neural network model (e.g., the trained model 222). For example, the model construction module 216 can determine a distribution of a target variable in the training data and/or can determine a type of predictive modeling problem (e.g., regression or classification) to be solved. The distribution of the target variable can be determined, for example, by creating a histogram for the target variable. The histogram can then be analyzed to estimate a distribution (e.g., uniform, normal, Tweedie, gamma, or Poisson distribution) based on values contained in each bin. The type of predictive modeling problem to be solved can be received from user input (e.g., a user specifying whether the problem is regression or classification). Alternatively or additionally, the modeling problem can be automatically inferred based on a data type or format used for the target variable. For example, if a column of target values includes integers, then the modeling problem is more likely to be classification. If the target values are floating point or decimals, then the modeling problem is more likely to be regression, for example, because there may not be a finite number of classes for classification and/or a regression model can produce floating point output.

Once the target distribution and/or type of modeling problem have been determined, the model construction module 216 can choose a suitable loss function for the model and/or can choose a suitable output activation function. The target variable can be or include a parameter that is or will be predicted by the neural network model. The distribution of the target variable can be or approximate, for example, a normal distribution, a multimodal distribution (e.g., a bimodal distribution), a uniform distribution, or other type of distribution.

In various examples, neural networks can be trained using an optimization process that utilizes a loss function to calculate the model error. The loss function can be or provide a measure of how well the model performs in terms of being able to predict an expected outcome or value. Maximum likelihood can provide a framework for choosing a loss function when training neural networks and machine learning models. Exemplary types of loss functions can include, for example, cross-entropy, Tweedie, Gamma, Poisson, root mean square log error (RMSLE), and mean squared error (MSE).

In various implementations, the loss function chosen by the model construction module 216 can be used to evaluate an accuracy of predictions made by the neural network model. For example, small errors or small losses calculated by the loss function can be indicative of accurate predictions, while large errors or large losses can be indicative of inaccurate predictions. The loss function can provide a gauge for measuring model prediction accuracy, based on a comparison between model predictions and known values.

In general, the model construction module 216 can choose a loss function based on the target distribution and/or the type of modeling problem to be solved. For example, for regression problems, the model construction module 216 can choose the following: a Tweedie loss function when the target is zero-inflated (e.g., a distribution that allows for frequent zero-valued observations); a Poisson loss function when the target follows or approximates a Poisson distribution; a Gamma or RMSLE loss function when the target follows or approximates an exponential distribution; and a root mean square error (RMSE) loss function in a general case (e.g., when the target distribution is linear). Likewise, for classification problems, the model construction module 216 can choose the following: a sparse categorical cross entropy loss function when the determined type of predictive modeling problem is a mutually exclusive multiclass classification problem; or a binary cross entropy loss function when the determined type of predictive modeling problem is a binary classification problem or an independent multiclass problem. In various examples, the chosen loss function can be displayed on a client device of a user. The user can override the chosen loss function, if desired, by selecting a different loss function from a list of possible choices. Such user selection can be made after an initial training of the model.

In some embodiments, model construction module 216 can choose an output activation function (e.g., for an output layer of the neural network) based on the selected loss function. For example, when the loss function is logarithmic in nature (e.g., Tweedie, Gamma, Poisson, or RMSLE), an exponential output activation function can selected (e.g., $e^x$ where 'x' is an output from the output layer). For non-logarithmic loss functions, a linear output activation function or other output activation function may be used. In various examples, the chosen output activation function can be displayed on a client device of a user. The user can override the chosen output activation function, if desired, by selecting a different output activation function from a list of possible choices. Such user selection can be made after an initial training of the model.

According to some embodiments, the model construction module 216 can form a residual connection from an input layer (e.g., input layer 110 shown in FIG. 1) directly to an output layer (e.g., output layer 140 shown in FIG. 1), such that any hidden layers (e.g., hidden layers 120 and 130 shown in FIG. 1) are bypassed. One approach for creating such a residual connection is to introduce a linear layer (e.g., having a linear activation function) with no bias between the input and output layers. The linear layer can have an input shape (e.g., an input data size) that matches an output shape (e.g., an output data size) of the input layer. An output shape of the linear layer can match an input shape of the output layer.

In some embodiments, by providing a direct connection between the output layer and the input layer, the residual connection can reduce or avoid information loss that can result from the use of hidden layers. For example, the hidden layers and associated activation functions can compress a dimensionality (e.g., size) of the data and/or introduce information loss. The residual connection can allow the neural network to leverage the input data more directly. For example, the residual connection can allow the neural network to discover linear relationships that may exist between the input layer and the output layer.

Figure 4:
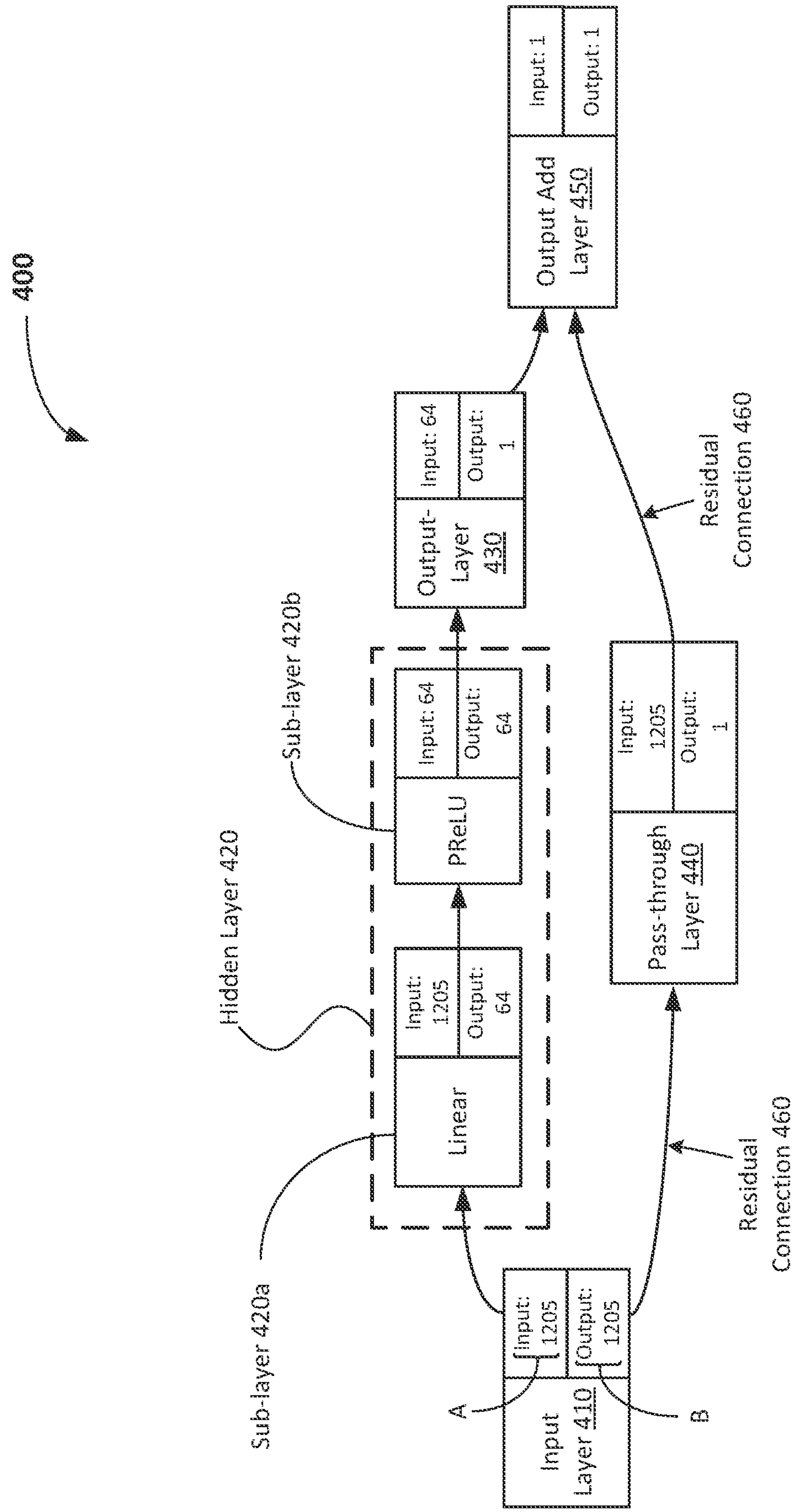
FIG. 4 is a schematic diagram of an exemplary regression neural network having a residual connection, in accordance with certain embodiments.

FIG. 4 is a schematic diagram of an exemplary regression neural network 400 featuring a residual connection 460 via a linear pass-through layer 440. The network 400 further includes an input layer 410, a plurality of hidden layers 420, an output layer 430, and an output add layer 450. Output from the output layer 430 is connected to the output add layer 450, which can include or be followed by an output activation function. As depicted, the pass-through layer 440 of the residual connection 460 bypasses the hidden layers 420 and the output layer 430 by providing a direct connection between the input layer 410 and the output add layer 450. The pass-through layer 440 can be a dense layer having a number of inputs (e.g., 1205) that is equal to a number of outputs of the input layer 410, and a number of outputs (e.g., 1) that is equal to a number of inputs of the output add layer 450. The pass-through layer 440 can have weights and a bias that are trained in a training process along with weights and biases of other layers. In the depicted example, the pass-through layer 440 is not followed by an activation function. The output add layer 450 can combine or add output from the pass-through layer 440 and output from the output layer 430. Output activation can be applied following the output add layer 450, if applicable. The hidden layers 420 in this example includes a first hidden layer 420*a* and a second hidden layer 420*b*. The first hidden layer 420*a* utilizes a linear activation function and the second hidden layer 420*b* utilizes a parametric rectified linear unit (PReLU) activation function.

Each layer of the network 400 includes a respective input A and a respective output B. In general a shape or size of an output of a preceding layer matches a shape or size of an input of a subsequent layer. For example, output B of the input layer 410 has a size of 1205 (e.g., 1205 neurons in the input layer 410), which is equal to the size of input A in the first hidden layer 420*a* and in the pass-through layer 440. Similarly, the size of output B in the second hidden layer 420*b* (e.g., 64 neurons in the second hidden layer 420*b*) is equal to the size of input A in the output layer 430. In general, the size or number of outputs of a layer can be equal to the number of neurons in the layer.

Figure 5:
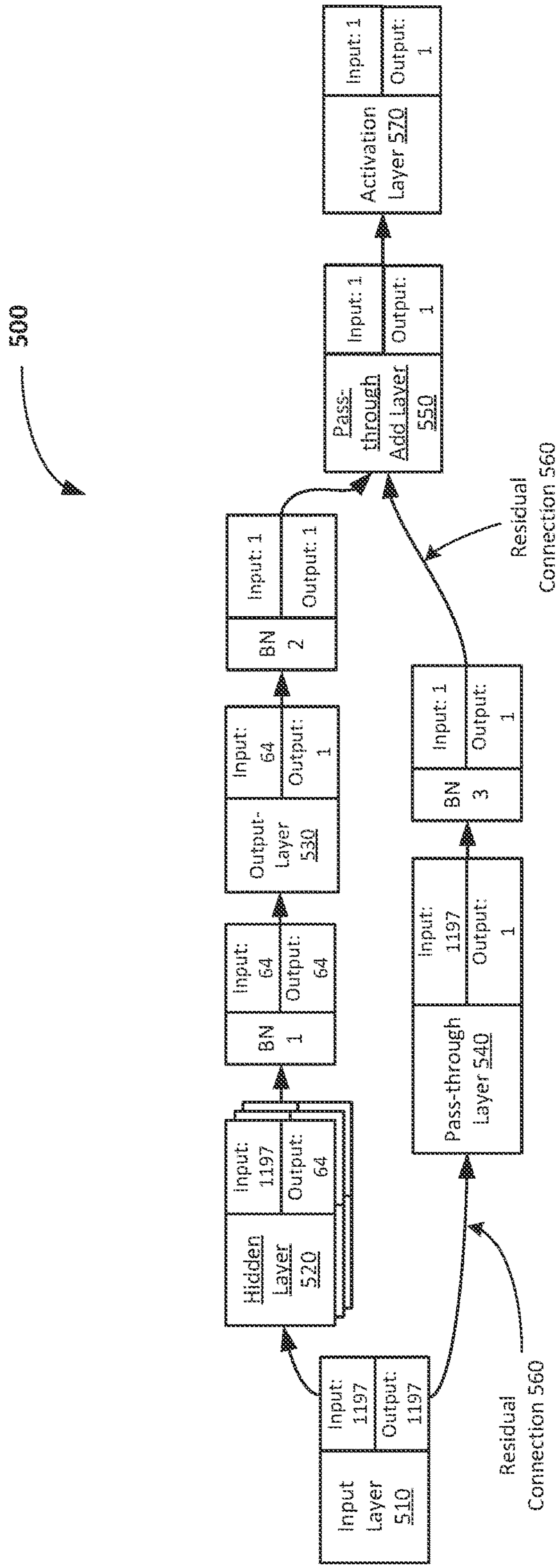
FIG. 5 is a schematic diagram of an exemplary binary or independent multi-class neural network having a residual connection, in accordance with certain embodiments.

According to some embodiments, FIG. 5 shows an exemplary binary or independent multi-class network 500 which, like the regression network 400, features a residual connection 560 that includes a pass-through layer 540. The network 500 includes a hidden layer 520, which can be or include a dense or fully connected layer followed by an activation function. As depicted, the pass-through layer 540 of the residual connection 560 bypasses the hidden layer 520 and provides a direct connection between the input layer 510 and a later layer, which in the depicted example is a pass-through add layer 550. The pass-through add layer 550 can combine or add output from the pass-through layer 540 and output from an output layer 530. According to some embodiments, the network 500 can utilize batch normalization (as indicated by BN1, BN2, and BN3) at the output of one or more layers (e.g., following the activation function). A non-linear activation layer 570 can include or apply a nonlinear activation function (e.g., a sigmoid function). Advantageously, use of the residual connection 560 can allow the network 500 to learn linear relationships between features (e.g., by not passing through a hidden layer plus non-linearity). The learned linear relationships can enrich what the network 500 learns through the use of one or more hidden layers plus non-linearity (e.g., non-linear activation functions).

In some examples, the model construction model 216 can initialize an output layer bias so that model output is equal a mean of the target data (e.g., after inverting the output activation function). This can initialize the model to output values that are close to the target, rather than requiring the model to be trained to learn the target mean. For example, if the output layer provides or utilizes a relationship such as Wx+b where W is a weight matrix, x is input, and b is bias, an initial value for b can be set to a mean of the target data. This can allow the initial output from the output layer to be substantially close to the target mean. For non-linear output activation functions, the initial bias can be determined by inverting the output activation function. For example, if the output activation function is exponential (e.g., $e^x$), then before finding the mean of the target data the inverse function (e.g., natural log) of each target value should be taken first. This can ensure that the target mean is obtained when the initial bias is passed through the activation function. In the case where the activation is exponential, the output bias can be initialized by taking the mean of the target's logarithmic value (e.g., mean(log(target)). Additionally or alternatively, the model construction model 216 can auto-scale the output of a network from an alternate range than that of the target to the range of the target. For example, when an activation function provides output having a range (e.g., −1 to 1) that is inconsistent with a range of the target (e.g., 0 to 1), the output can be automatically scaled to be consistent with the range of the target.

Figure 6:
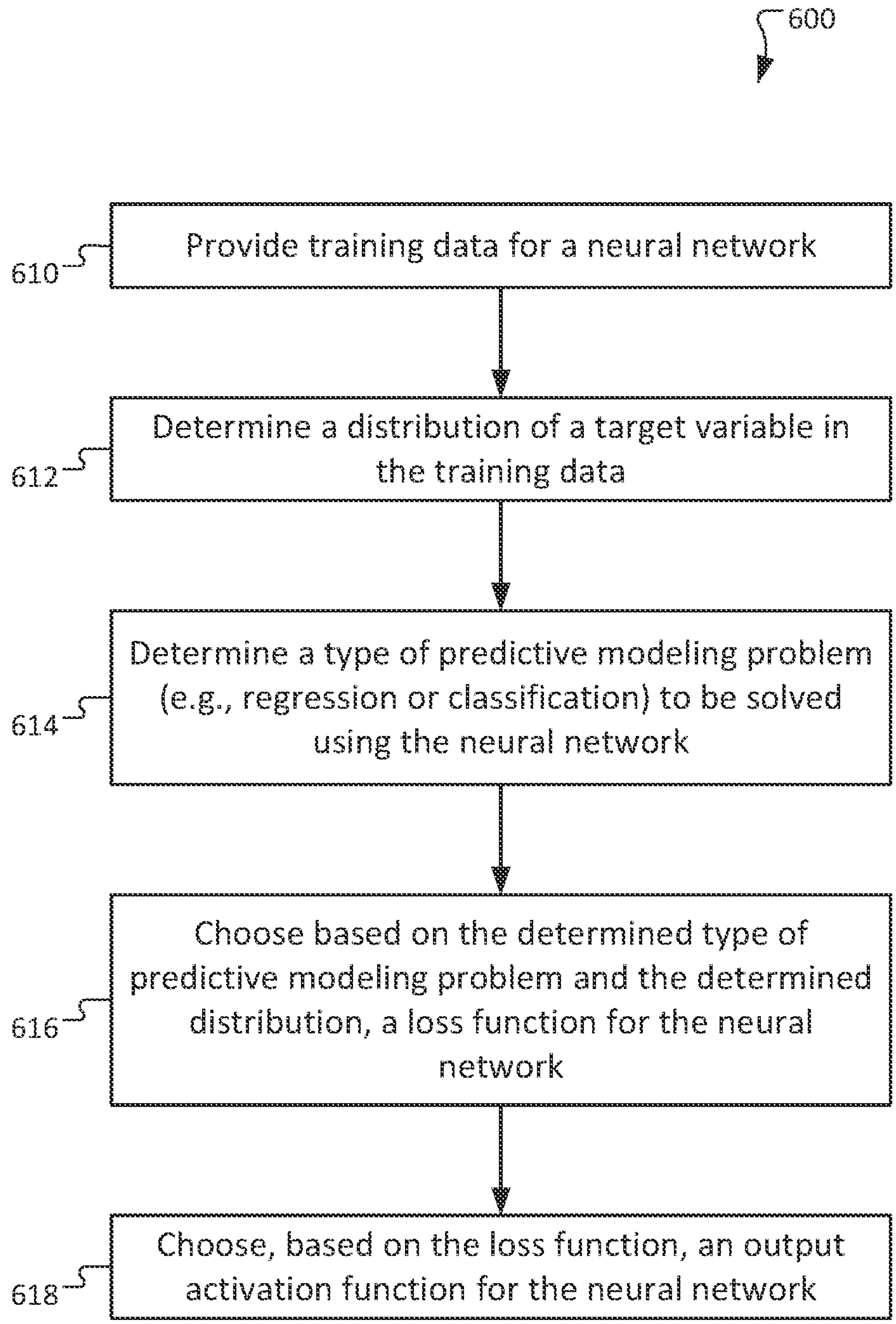
FIG. 6 is a flowchart of a method of designing a neural network, in accordance with certain embodiments.

FIG. 6 is a flowchart of a method 600 of designing a neural network. Training data for a neural network is provided (step 610). A distribution of a target variable in the training data is determined (step 612). A type of predictive modeling problem to be solved using the neural network (e.g., regression or classification) is determined (step 614). Based on the determined type of predictive modeling problem and the determined distribution, a loss function for the neural network is chosen (step 616). Based on the loss function, an output activation function for the neural network is chosen (step 618).

Initial Hyperparameter Determination

With previous approaches, there is no simple and easy way to set hyperparameters, such as learning rate, mini-batch size, momentum, and weight decay. Tuning hyperparameters manually can be a slow process that requires significant resources and computational hours. For example, manual hyperparameter tuning can require expertise and writing code, and can result in suboptimal performance and limited freedom. A grid search (e.g., a process that searches exhaustively through a manually specified subset of the hyperparameter space) or a random search of a hyperparameter space can be computationally expensive and time consuming, and can require significant manual expertise. Further, training time and final model performance can be highly dependent on good choices. Advantageously, the systems and methods described herein are able to automatically choose and/or adjust hyperparameter values in a manner that significantly improves training efficiency and model accuracy. For example, the systems and methods can enable neural networks to be trained using CPUs. By comparison, previous approaches for training neural networks have used GPUs.

Referring again to FIG. 2, in various examples, the initial hyperparameter module 218 can be used to determine initial values for a set of hyperparameters that can be used to train a neural network model. The initial values can be determined based on one or more guidelines and/or heuristics developed through experimentation. In one example, experiments were performed on hundreds of data sets using a wide variety of hyperparameter types, hyperparameter values, model architectures, and training data, to arrive at appropriate heuristics and guidelines for determining initial hyperparameter values. As indicated below, initial hyperparameter values can be determined based on, for example, a size of the training dataset (e.g., a number of observations, rows, and/or columns) and/or a type of predictive modeling problem being solved (e.g., regression or classification) using the neural network.

Mini-Batch Size

In some instances, for example, initial hyperparameter module 218 can be used to determine a mini-batch size (e.g., a number of samples) for a mini-batch of training data. In general, a neural network can be trained repeatedly with mini-batches of training data (e.g., small subsets of an overall set of training data), which may be randomly selected from the training data. The "mini-batch size" hyperparameter can define a number of samples or observations (e.g., 10, 20, 50, 100, 200, 500, 1000, etc.) that are included in each mini-batch. Each sample or observation can correspond to a row of the training data.

In general, an initial value for the mini-batch size can be determined based on a size of the training dataset (e.g., a number of rows and/or columns in the dataset). For example, when the training dataset is or includes tabular data, the initial mini-batch size can be about 1% of the rows of the training dataset, such that the training dataset can include about 100 mini-batches of data. For smaller training datasets (e.g., less than about 2,000 rows), two separate models can be trained with different mini-batch sizes. The mini-batch size for one of the models can be, for example, 1% of the number of rows or samples in the training dataset. The mini-batch size for the other model can be, for example, 10% of the number of columns of training data (e.g., as adjusted by the pre-processing module 212). Both of the resulting models can be benchmarked or validated using a holdout portion of the training data, and the superior performing model can be selected for further use.

Learning Rate

To calculate how weights should be updated after running each mini-batch of training data, the gradient of the loss function can be calculated and multiplied by a hyperparameter referred to as the "learning rate." Determining a suitable or optimal value for the learning rate is not a trivial task. According to some embodiments, key considerations towards determining the learning rate can include, for example: (i) the learning rate should increase when repeatedly updating in the same direction or decrease when not (e.g., an adaptive learning rate); (ii) each layer should have its own adaptive learning rate because different layers can have different weight magnitudes and different gradient magnitudes; (iii) upon reaching a minima (e.g., loss begins to plateau), learning rate should decay to descend as deeply as possible into the minima; (iv) warming up (starting at a low learning rate and building up) can help mitigate early overfitting; (v) a high learning rate early in training can help regularize the neural network; (vi) consider utilizing cyclic learning rates and cosine annealing (e.g., cyclically varying between reasonable bounds, instead of monotonically decreasing the learning rate, to improve handling saddle points, which can produce very small gradients); and (vii) utilize a single cycle that warms-up and maintains a high learning rate for some portion of training, decays for the bulk of training, and subsequently decays even further to descend into sharp minima.

In general, the learning rate can control or define how much the weights and/or biases of the neural network are adjusted at each training iteration based on an estimated prediction error. For example, a calculated loss function gradient (e.g., including a gradient of the loss function for each weight) at a given iteration or step can be multiplied by the learning rate to determine how much to update the weights of the network at that iteration. In general, smaller learning rates can result in smaller adjustments to the weights at each iteration, while larger learning rates result in larger adjustments. It can be desirable in various instances to keep the learning rate low to avoid overfitting of the training data, so that the model is regularized or better able to generalize across a wide variety of observations and datasets. Smaller learning rates, however, can result in lengthy or computationally expensive training sessions.

In various examples, the initial hyperparameter module 218 can calculate initial values for the learning rate hyperparameter based on a type of predictive modeling problem to be solved using the neural network. For example, when the type of problem is a regression problem involving text (e.g., one or more model input features or target features include text strings, rather than or in addition to numerical values and/or categorical values), the initial learning rate can be from about 0.001 to about 0.005, or about 0.003. For regression problems for which the loss function is Poisson, Gamma, or Tweedie, the initial learning rate can be from about 0.005 to about 0.025, or about 0.015. In a general case, the initial learning rate can from about 0.01 to about 0.05, or about 0.03.

Dropout Rate

The "dropout rate" can be a rate at which output from neurons in each layer is ignored. For example, a dropout rate of 1% can indicate that output from 1% of the neurons (e.g., in a layer) will be ignored at one or more iterations. Dropout can be used to reduce overfitting and generally involves temporarily preventing forward propagation of data in one or more neurons in the network. The specific neurons ignored or removed can vary during training (e.g., at each iteration).

In various examples, the initial hyperparameter module 218 can calculate an initial value for the dropout rate based on a size of the training data. In some instances, for example, the initial dropout rate can be small (e.g., from 0% to 5%) to discourage memorization or overfitting but still allow for quick convergence. In smaller datasets (e.g., having less than 2,000 rows), a slightly higher dropout rate (e.g., from about 5% to about 10%) can be used to further reduce the risk of overfitting. Alternative techniques to avoid overfitting may result in more optimal convergence, and it may be desirable to use a dropout rate of 0% in such instances.

Batch Normalization

In general, "batch normalization" involves encouraging the output of a layer of the neural network to have a certain average value and/or a certain amount of variation (e.g., a mean of 0 and a standard deviation of 1). In various examples, the initial hyperparameter module 218 can determine whether batch normalization is to be used, at least initially, based on the type of predictive modeling problem to be solved using the neural network. For example, batch normalization may be initially used only for binary classification or multiclass classification problems (e.g., that use a neural network architecture containing more than one hidden layer). It can be preferable to avoid batch normalization for regression problems or regression-based networks, given that batch normalization can hinder the network's ability to quickly converge to weights that determine an appropriate distribution of predicted values.

Number of Epochs

In various examples, "number of epochs" can refer to a number of full passes made through the training data during the training process. For example, when the training data is divided into 100 mini-batches, and each mini-batch corresponds to one training iteration, a single pass through the training data (i.e., one epoch) can involve 100 iterations.

Likewise, when the total number of epochs is set to five, training can involve five passes through the training data, for a total of 500 iterations.

In various examples, the initial hyperparameter module 218 can calculate an initial value for the number of epochs based on the type of predictive modeling problem to be solved using the neural network. For example, the initial number of epochs may be from 2 to 4 (e.g., 3) for regression problems, and from 3 to 5 (e.g., 4) for classification problems. Other approaches for determining the number of epochs can involve performing a preliminary training session, as described herein.

Hidden Activation

In various examples, "hidden activation" can be or include an activation function that follows one or more hidden layers in the neural network. Hidden activation can be used to introduce non-linearity, such that the network can learn non-linear patterns and/or utilize non-linear functions. In a general case, the initial hidden activation function may be the parametric rectified linear unit (PReLU) activation function. A shape of the PReLU activation function may change during training, for example, to use a most appropriate nonlinearity. Weights for the PReLU activation function can be incorporated (and may be adjusted) in each backward propagation pass during training. In some embodiments (e.g., involving self-normalizing networks), the initial hidden activation function may be a scaled exponential linear unit (SeLU).

Output Activation

In various examples, "output activation" can be or include an activation function that follows the output layer of the neural network. The initial hyperparameter module 218 can calculate an initial output activation function based on the training dataset and/or based on a type of predictive modeling problem to be solved. The initial output activation function for regression problems (solved using regression neural networks) may be, for example, (i) a linear activation function in a general case or (ii) an exponential activation function for training datasets having skewed targets where the loss function is or includes a Poisson distribution, a Gamma distribution, or a Tweedie distribution. Additionally or alternatively, the initial output activation function for classification problems or classification networks may be, for example, (i) a sigmoid activation function (e.g., for binary classification networks or independent multiclass or multilabel networks), or (ii) a softmax activation function (e.g., for mutually exclusive multiclass classification networks).

Figure 7:
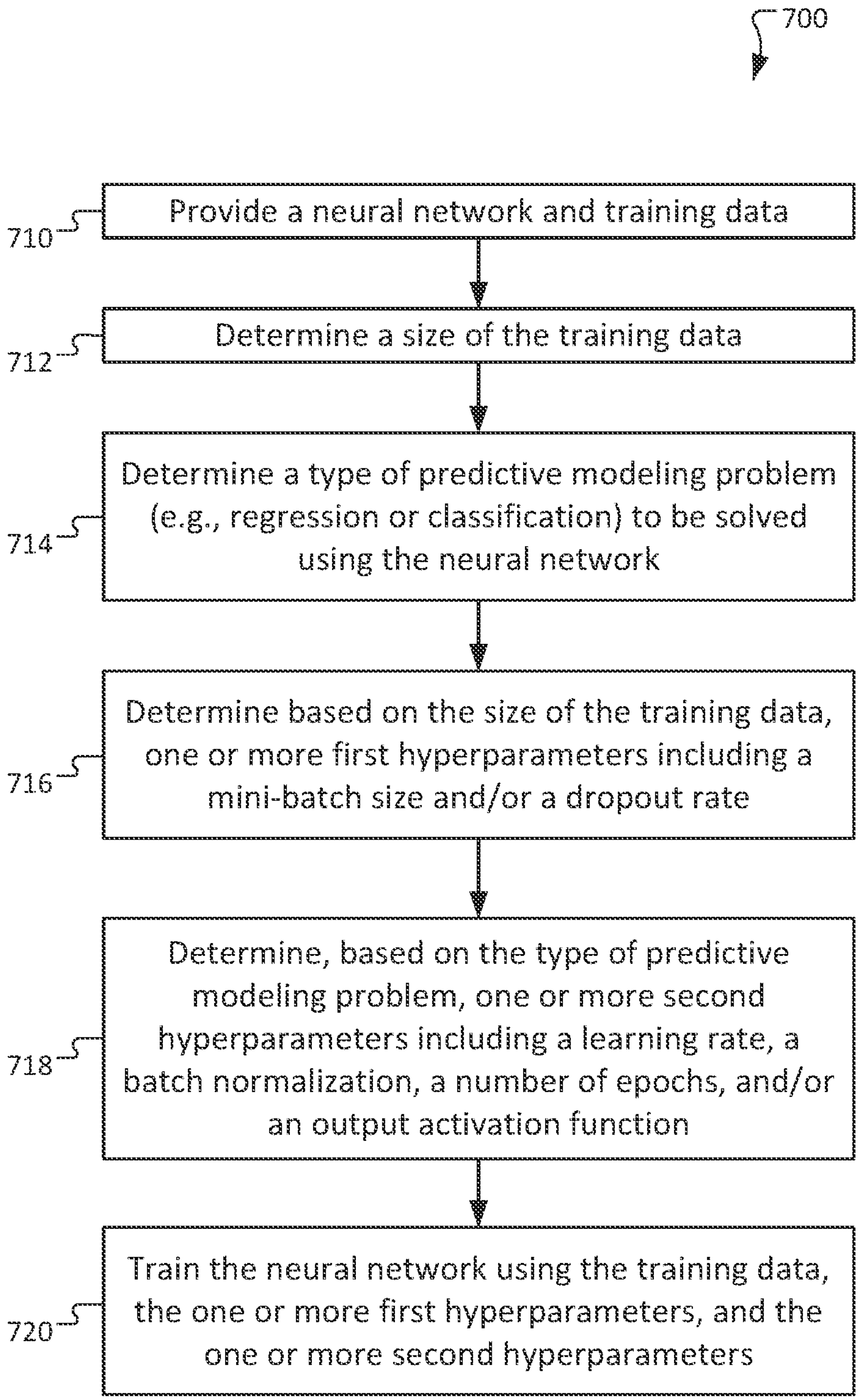
FIG. 7 is a flowchart of a method of training a neural network, in accordance with certain embodiments.

FIG. 7 is a flowchart of a method 700 of training a neural network. A neural network and training data are provided (step 710). A size of the training data (e.g., number of rows and/or columns) is determined (step 712). A type of predictive modeling problem to be solved (e.g., regression or classification) using the neural network is determined (step 714). Based on the size of the training data, one or more first hyperparameters are determined (step 716). The one or more first hyperparameters can include, for example, a mini-batch size and/or a dropout rate. Based on the type of predictive modeling problem, one or more second hyperparameters are determined (step 718). The one or more second hyperparameters can include, for example, a learning rate, a batch normalization, a number of epochs, and/or an output activation function. The neural network is trained (step 720) using the training data, the one or more first hyperparameters, and the one or more second hyperparameters.

Adapting Hyperparameters During Training

Referring again to FIG. 2, in various examples the hyperparameter adaptation module 220 can adapt or adjust one or more of hyperparameter values during the neural network training process. For example, the hyperparameter adaptation module 220 can determine a suitable number of training iterations or epochs and/or can construct and implement one or more training schedules for the hyperparameters, as described herein. Advantageously, in one experiment, adaptively updating hyperparameters using the techniques described herein improved model error by 70% for about 350 datasets.

Training Schedules

In various examples, the hyperparameters used to train the neural network model can be adjusted or adapted over time according to one or more training schedules. For example, one or more of the hyperparameters used for training the neural network can be set to the initial hyperparameter values (e.g., as determined by the initial hyperparameter module 218) and then adjusted over time, as training progresses (e.g., using the hyperparameter adaptation module 220). Examples of hyperparameters that can be varied according to a training schedule can include, without limitation: learning rate, momentum, batch size, dropout, regularization hyperparameters, or any custom hyperparameters or custom optimizer hyperparameters, such as weight decay, secondary or tertiary moment estimations, etc. In various examples, the "momentum" hyperparameter can be or refer to a measure of how quickly a step size for learning rate (or other hyperparameter) can change at each training iteration. Momentum can be implemented by configuring an optimizer to take into account previous gradients when calculating step size. A variety of different optimizers can be used. In some instances, the optimizer can be or include a function that is executed to determine what the weights of the network should be after a back-propagation step (e.g., at each iteration). A simple optimizer can calculate a gradient based on error determined by the loss function, the predicted values, and the actual values, then multiply the gradient by the learning rate, and subtract a resulting value from the weights. Some optimizers (e.g., ADAM) can update the learning rate during training using a variety of approaches. In general, momentum can be adjusted in an effort to speed up convergence and improve chances of finding optimal solutions.

Figure 8:
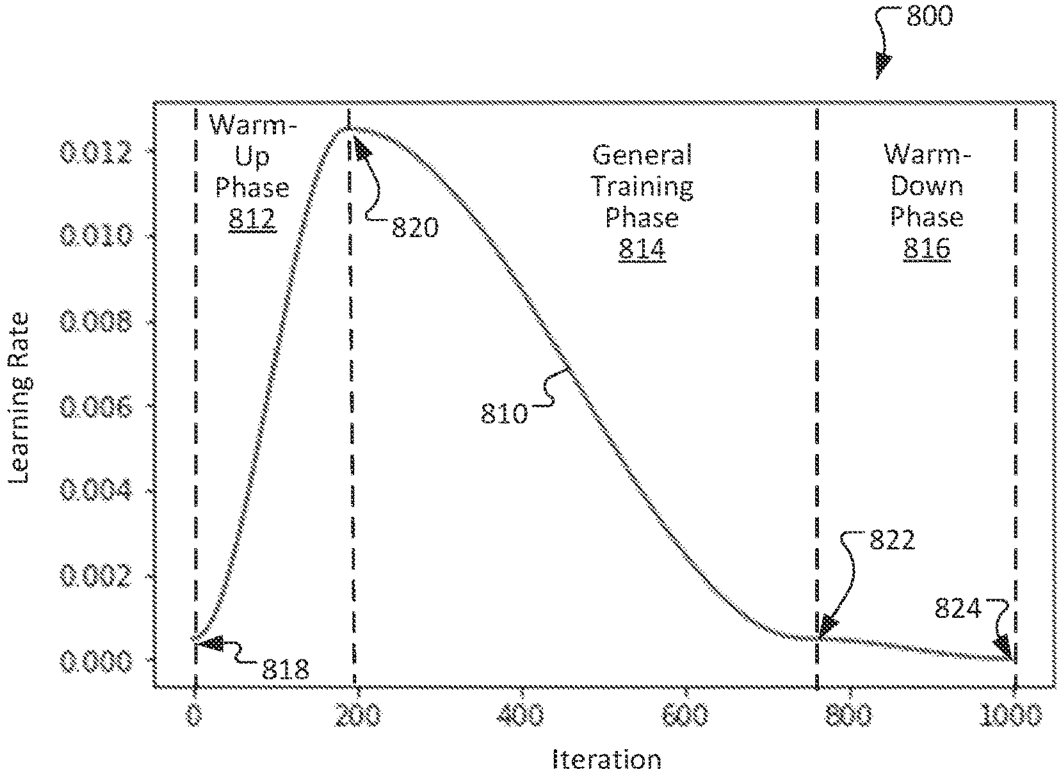
FIG. 8 is a plot of a training schedule for a learning rate hyperparameter, in accordance with certain embodiments.

FIG. 8 is a plot of a training schedule 800 for a learning rate 810 hyperparameter, in accordance with certain examples. The training schedule 800 shows the learning rate 810 over successive training iterations (a total of 1000 iterations in the depicted example) and is divided into three consecutive phases: a warm-up phase 812, a general training phase 814, and a warm-down phase 816. During the warm-up phase 812, the learning rate 810 increases from an initial value 818 to a maximum or peak value 820. The learning rate 810 then decreases during the general training phase 814 from the peak value 820 to an initial warm-down value 822, which is typically the same as the initial value 818. The learning rate 810 then further decreases during the warm-down phase 816 from the initial warm-down value 822 to a final value 824.

Values for the learning rate 810 during each phase can vary according to a sinusoidal function, a linear function, a polynomial function, other functional form, or any combination thereof that provides desired values and/or a desired rates of change. In some examples, the initial value 818 can be determined from the peak value 820, as follows:

$$\text{Initial Value}=C1\times\text{Peak Value}, \quad (1)$$

where C1 is from about 0.01 to about 0.2, or about 0.04. The final value 824 can be obtained from $$\text{Final Value} = C2 \times \text{Peak Value}, \tag{2}$$

where C2 is from about 0.001 to about 0.005, or about 0.002. The peak value 820 in the depicted example is about 0.0125. In various examples, the peak value 820 can be obtained from the initial hyperparameter module 218, as described herein.

The warm-up phase 812, the general training phase 814, and the warm-down phase 816 can each occupy a specified portion of the training schedule 800. For example, the warm-up phase 812 can occupy from about 10% to about 30% (e.g., about 25%) of the training iterations. Likewise, the general training phase 814 can occupy from about 30% to about 70% (e.g., about 50%) of the training iterations. Finally, the warm-down phase 816 can occupy from about 10% to about 30% (e.g., about 25%) of the training iterations. In the depicted example, the warm-up phase 812 occupies approximately the first 200 iterations (20% of the 1000 total iterations), the general training phase 814 occupies the next approximately 550 iterations (55% of the 1000 total iterations), and the warm-down phase 816 occupies the final approximately 250 iterations (25% of the 1000 total iterations).

Figure 9:
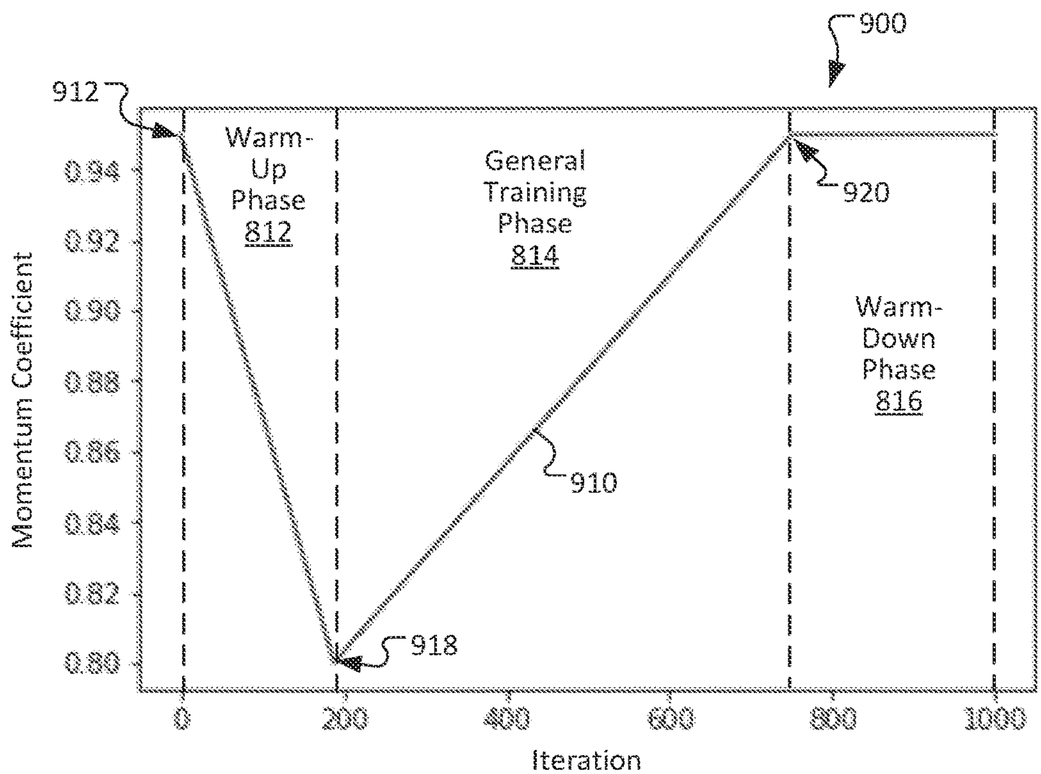
FIG. 9 is a plot of a training schedule for a momentum hyperparameter, in accordance with certain embodiments.

FIG. 9 is a plot of a training schedule 900 for a momentum 910 hyperparameter (alternatively referred to as a "momentum coefficient"), in accordance with certain examples. The training schedule 900 shows the momentum 910 over successive training iterations (a total of 1000 iterations in the depicted example) and is divided into the warm-up phase 812, the general training phase 814, and the warm-down phase 816. During the warm-up phase 812, the momentum 910 decreases from an initial value 912 to a minimum value 918. The momentum 910 then increases during the general training phase 814 from the minimum value 918 to a final value 920. The momentum 910 can remain substantially constant at the final value 920 during the warm-down phase 816. Values for the momentum 910 can follow linear functions within each of the phases, as depicted. Alternatively of additionally, the momentum can be varied according to other functional forms, such as, for example, a sinusoidal function, a polynomial function, other functional form, or any combination thereof that provides desired values and/or desired rates of change. In some examples, the initial value 912 and/or the final value 920 can be from about 0.90 to about 0.99 (e.g., about 0.95). The minimum value 918 can be, for example, from about 0.80 to about 0.90 (e.g., about 0.85). The momentum and learning rate hyperparameters can be varied simultaneously during the same training session, with momentum and learning rate each having its own schedule, as shown in FIGS. 8 and 9. Other hyperparameters (e.g., dropout rate, batch size, and/or weight decay) can be varied according to similar schedules, during the same training session.

In certain implementations, the momentum 910 can be equal to a beta (β) parameter from an adaptive learning rate optimization algorithm, such as Adaptive Moment Estimation (ADAM). At each iteration (e.g., back propagation pass) an optimizer for ADAM can attempt to improve estimates for a first moment and a second moment. These moments can be used to help choose a learning rate, which can adaptively change based on recently observed gradients. The first moment can be a mean of the gradient, and the second moment can be an uncentered variance of the gradient. Estimates for the moments can be obtained by determining exponential moving averages of past gradients and past gradients squared. Averages can decay at each iteration and can be controlled by β1 and β2 hyperparameters, respectively.

Determining a Number of Epochs

In various instances, it can be difficult to know in advance how many epochs (or iterations) of training are required to adequately train a neural network model. One approach to determining a suitable number of epochs can involve training the model with different numbers of epochs and selecting a number that provides an accurate model and/or does not require an excessive training time. For example, the number of epochs can be increased until the model accuracy does not change significantly.

In other embodiments, the number of epochs can be determined by cycling or oscillating the learning rate, momentum, and/or one or more other hyperparameters during an exploratory or preliminary training of a neural network model. The determined number of epochs can then be used to train the neural network model in a subsequent or final training session, for example, using a set of initial hyperparameters and/or the training schedules shown in FIGS. 8 and 9.

Figure 10:
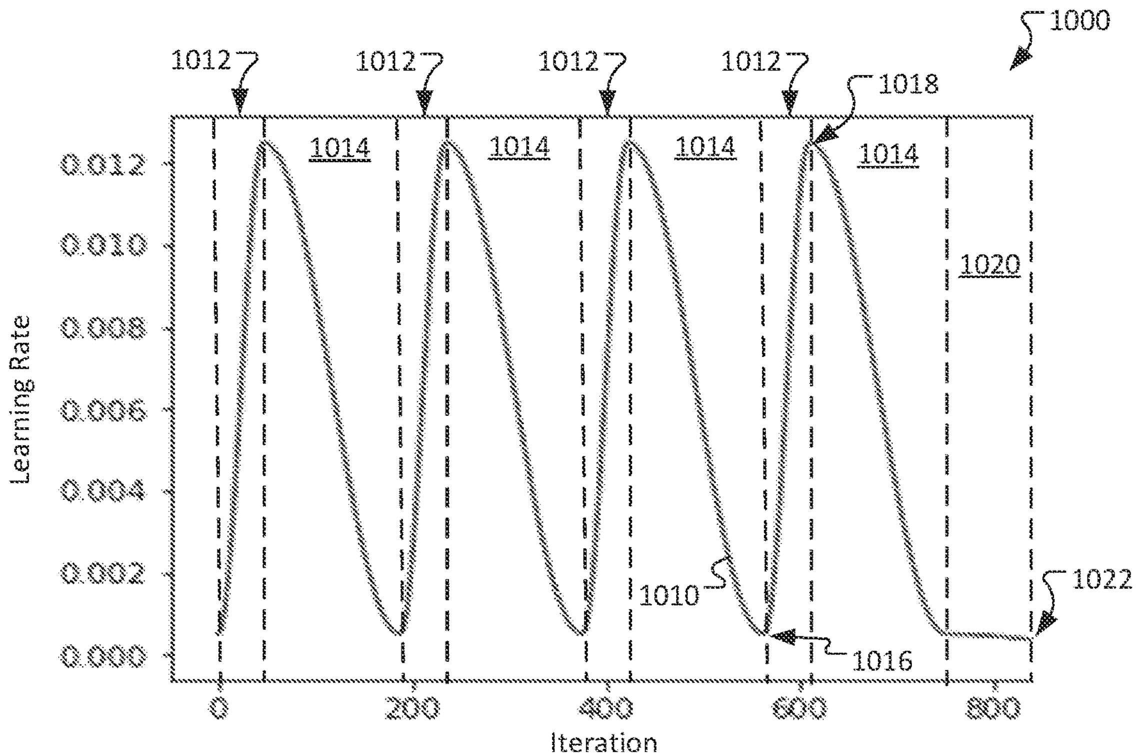
FIG. 10 is a plot of a preliminary training schedule for a learning rate hyperparameter during a preliminary training session, in accordance with certain embodiments.

For example, FIG. 10 is a plot of a preliminary training schedule 1000 for learning rate 1010 during a preliminary training session, in accordance with certain examples. The preliminary training session involves oscillating or varying the learning rate 1010 over multiple cycles of iterations. Each cycle can include a warm-up phase 1012 and a general training phase 1014. The learning rate 1010 can increase during each warm-up phase 1012 from a minimum value 1016 to a maximum value 1018. The learning rate 1010 can decrease during each general training phase 1014 from the maximum value 1018 to the minimum value 1016. In various examples, the minimum value 1016 and the maximum value 1018 can be equal or similar to the initial value and the peak value, respectively, used in a training schedule for a subsequent or final training session (e.g., the initial value 818 and the final value 820 in the training schedule 800). In some examples, the minimum value 1016 can be determined from the maximum value 1018, as follows:

$$\text{Minimum Value} = C3 \times \text{Maximum Value}, \tag{3}$$

where C3 is from about 0.01 to about 0.2, or about 0.04. Values for the learning rate 1010 during each phase can vary according to a sinusoidal function, a linear function, a polynomial function, other functional form, or any combination thereof that provides desired values and/or desired rates of change. The minimum value 1016 and/or the maximum value 1018 can remain constant and/or can be varied over successive iterations, as described herein. In the depicted examples, the number of iterations per oscillation cycle is about 200; however, other numbers of iterations per oscillation cycle (e.g., about 50, 100, 300, 500, etc.) can be used.

Model prediction error can be determined (e.g., using a loss function) during or after each cycle by comparing the model predictions with actual values (e.g., using a portion of training data that is specifically separated or held out during this phase, such as about 15% of the training data). In general, model prediction error can decrease over successive cycles and eventually reach a point where significant changes no longer occur. Once the model prediction error is constant or no longer decreasing substantially (e.g., by at least 1%, 5%, or 10%) from one cycle to a next cycle, the total number of cycles performed (four in the depicted example) can be recorded. In one example, the number of epochs to use in a subsequent or final training session can be determined based on the recorded number of cycles or iterations performed during the preliminary training session, as described herein. The preliminary training session can then proceed to a warm-down phase 1020. The learning rate 1010 can decrease during the warm-down phase 1020 from the minimum value 1016 to a final value 1022. In various examples, the final value 1022 can be equal or similar to a final value used in a training schedule for a subsequent or final training session (e.g., the final value 824 in the training schedule 800). The final value 1022 can be determined from the maximum value 1018, as follows:

$$\text{Final Value} = C4 \times \text{Maximum Value}, \quad (4)$$

where C4 is from about 0.001 to about 0.005, or about 0.002.

In some instances, for example, after each cycle has been performed in the preliminary training schedule 1000, the model can be benchmarked on data separated or held out from the training data during this phase, though all training data may subsequently be used to train the model. If model accuracy has improved compared to a previous cycle, model parameters (e.g., weights and/or biases) can be saved and an additional cycle can be performed. Additional cycles can be performed, as needed, until the accuracy no longer improves or until a threshold number of cycles (alternatively referred to as "patience") has been reached. Once the model accuracy stops improving after performing an additional cycle or the specified patience has been reached with no accuracy improvement, the model weights, biases, and/or other model parameters can be saved.

At this point, in some instances, the preliminary training schedule 1000 can be adjusted for subsequent iterations by adjusting the maximum value 1018 and/or the minimum value 1016, such that a difference between the maximum value 1018 and the minimum value 1016 is smaller (e.g., by a factor of 1.5, 2, 3, or more). For example, the maximum value 1018 can be decreased (e.g., cut in half or divided by two) and/or the minimum value 1016 can be adjusted (e.g., by doubling C3 from equation (3)). Other methods of decreasing the difference between the maximum value 1018 and the minimum value 1016 are possible. Additional cycles can then be performed to further train the model using the modified preliminary training schedule 1000, until model accuracy no longer improves with additional cycles or the specified patience has been reached with no accuracy improvement. At this point, the difference between the maximum value 1018 and the minimum value 1016 can be further decreased (e.g., by cutting the maximum value in half again and optionally doubling C3), and further cycles can be performed until the specified patience is met. This process of (i) adjusting the maximum value 1018 and/or the minimum value 1016 and (ii) performing additional cycles until the specified patience is met can be repeated multiple times. In one example, the process can be stopped when the maximum value 1018 is less than or equal to an original value for the minimum value 1016 in the preliminary training schedule 1000.

Once all desired or necessary cycles have been performed, the preliminary training session can proceed to the warm-down phase 1020. This can involve, for example, resetting the model parameters (e.g., weights and/or biases) to values corresponding to when the model had a lowest error prior to performing the warm-down phase 1020.

After completion of the preliminary training schedule 1000, the total number of cycles and/or iterations performed during the preliminary training session can be used to define the number of epochs to be used during the subsequent or final training of the neural network model. For example, the number of epochs used for the final training session can be equal to the number of cycles performed during the preliminary training session. Additionally or alternatively, the number of epochs can be defined as the number of cycles performed plus or minus some integer number, such as 1 or 2. For example, 4 cycles were performed in the example in FIG. 10, which means the number of epochs to use for the final training session can be set to 4. In other examples, the number of epochs to be performed during the final training session can be derived from the total number of iterations performed during preliminary training session. For example, if the preliminary training session (e.g., including all cycles and/or all cycles plus the warm-down phase 1020) lasted 1000 iterations and there are 250 iterations per epoch, then the total number of epochs to be used in the final training session can be 4 (i.e., 1000/250).

Once the desired number of epochs for the final training session has been determined, the hyperparameter training schedules for the final training session can be constructed. For example, referring again to FIGS. 8 and 9, the learning rate schedule 800 and/or momentum schedule 900 can be constructed such that the schedules cover the determined number of epochs. Each schedule can be configured, for example, to cover a number of iterations required to achieve the determined number of epochs. In one example, if there are 250 iterations per epoch and the determined number of epochs is 4, then the training schedules can be configured to cover 1000 iterations.

Configuring a training schedule can involve, for example, stretching or compressing a duration of the training schedule (e.g., in an x-direction) so that the training schedule covers the desired number of epochs or iterations. Additionally or alternatively, configuring the training schedule can involve preserving one or more minimum, maximum, or other values for the hyperparameter. For example, configuring the training schedule in FIG. 8 can involve adjusting the training duration to cover the desired number of epochs or iterations while, at the same time, preserving the initial value 818, the peak value 820, the initial warm-down value 822, and/or the final value 824.

Referring again to FIG. 10, the warm-up phase 1012, the general training phase 1014, and the warm-down phase 1020 in the preliminary training schedule 1000 can each be performed for a specified number of iterations, which can be any suitable integer number. For example, the warm-up phase 1012 can have a duration in a range from about 10 iterations to about 100 iterations. The general training phase 1014 can have a duration in a range from about 50 iterations to about 300 iterations. The warm-down phase 1020 can have a duration in a range from about 20 iterations to about 200 iterations. Other iteration numbers can be utilized and/or determined through experimentation. In the depicted example, the warm-up phase 1012 lasts for about 50 iterations, the general training phase 1014 lasts for about 150 iterations, and the warm-down phase 1020 lasts for about 100 iterations.

Figure 11:
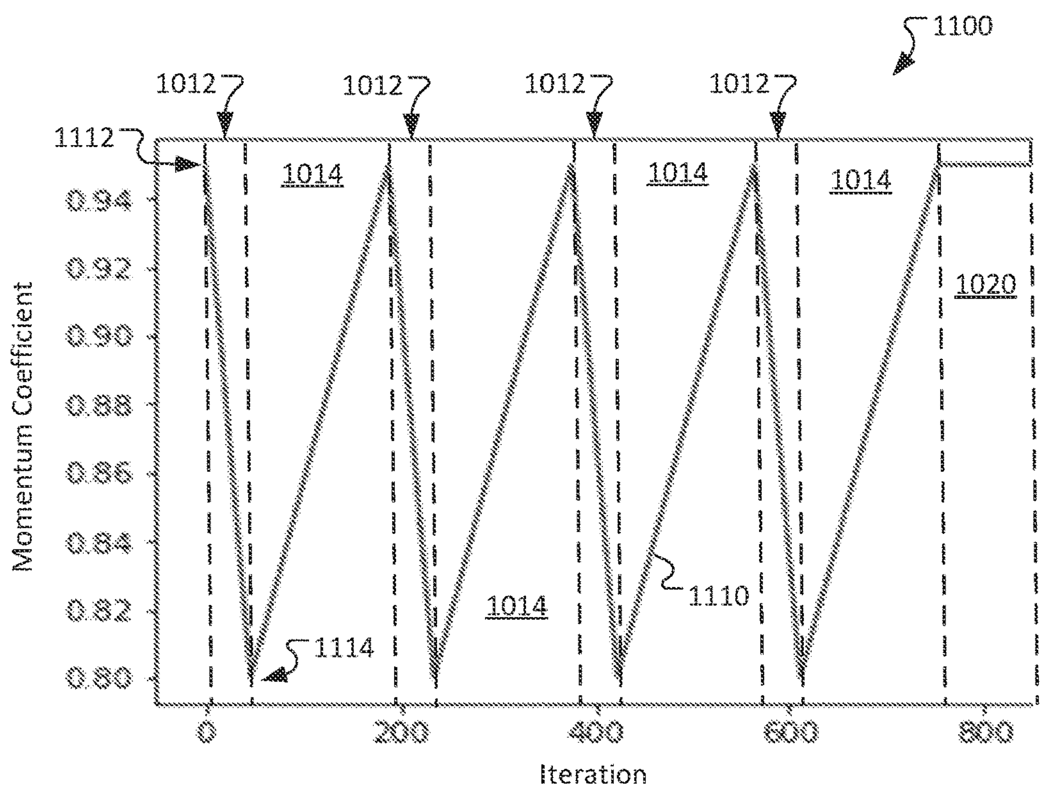
FIG. 11 is a plot of a preliminary training schedule for a momentum hyperparameter during a preliminary training session, in accordance with certain embodiments.

Additionally or alternatively, the preliminary training session can involve cycling or oscillating the momentum hyperparameter or other hyperparameters. For example, FIG. 11 is a plot of a preliminary training schedule 1100 for momentum 1110 during the preliminary training session. Each cycle can include the warm-up phase 1012 and the general training phase 1014, as described above for FIG. 10. The momentum 1110 can decrease (e.g., according to a linear, sinusoidal, or other function) during the warm-up phase 1012 from a maximum value 1112 to a minimum value 1114. The momentum 1110 can increase (e.g., according to a linear, sinusoidal, or other function) during the general training phase 1014 from the minimum value 1114 to the maximum value 1112. The momentum 1110 can remain substantially constant at the maximum value 1112 during the warm-down phase 1020. The preliminary training schedule 1100 can be performed during the preliminary training session while one or more other preliminary training schedules (e.g., the training schedule 1000) are also being performed. The minimum value 1114 and/or the maximum value 1112 can remain constant and/or can be varied over successive iterations.

Figure 12:
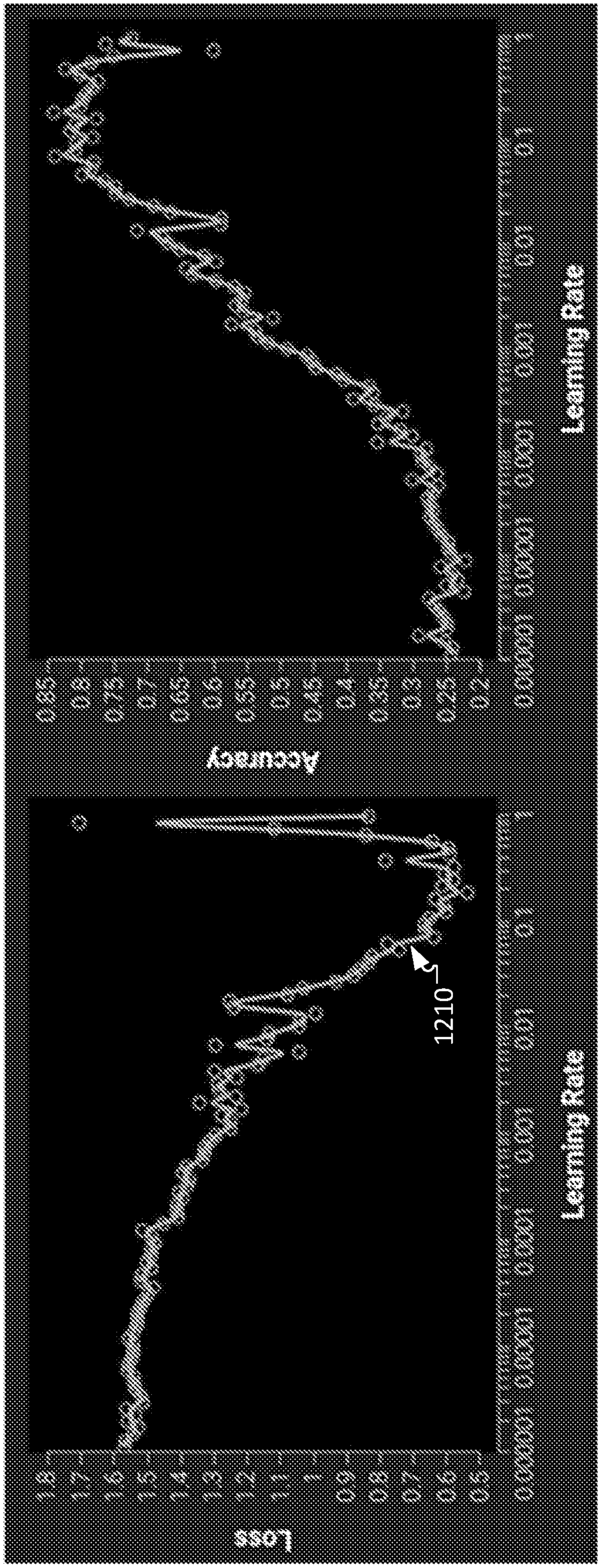
FIG. 12 includes plots of loss vs. learning rate and accuracy vs. learning rate, in accordance with certain embodiments.

In certain examples, a desired learning rate for training a neural network model can be determined by training the model with a wide range of learning rates and determining which learning rate provides suitable optimal results. For example, FIG. 12 includes plots of loss vs. learning rate and accuracy vs. learning rate for an example where the learning rate was varied from a small value (e.g., 0.000001) to a large value (e.g., 1), while a neural network model was being trained using multiple iterations or mini-batches of training data (e.g., 50, 100, 500, 1000 or more mini-batches). Each mini-batch of training data can be associated with a different learning rate. In other examples, each learning rate can be used for multiple mini-batches. After each iteration and/or for each learning rate, model loss and/or accuracy can be calculated, and the loss and accuracy can be plotted versus learning rate as shown in the figure. Gradients, variance, and/or loss values can be used to identify a learning rate at which the model is consistently improving. An optimal learning rate can correspond to a location 1210 in the loss vs. learning rate plot where there is a high negative gradient, a low loss, and/or a low variance. The optimal learning rate can be used in one or more learning rate training schedules. For example, the peak value 820 and/or the maximum value 1018 can be equal to or derived from the optimal learning rate.

Figure 13:
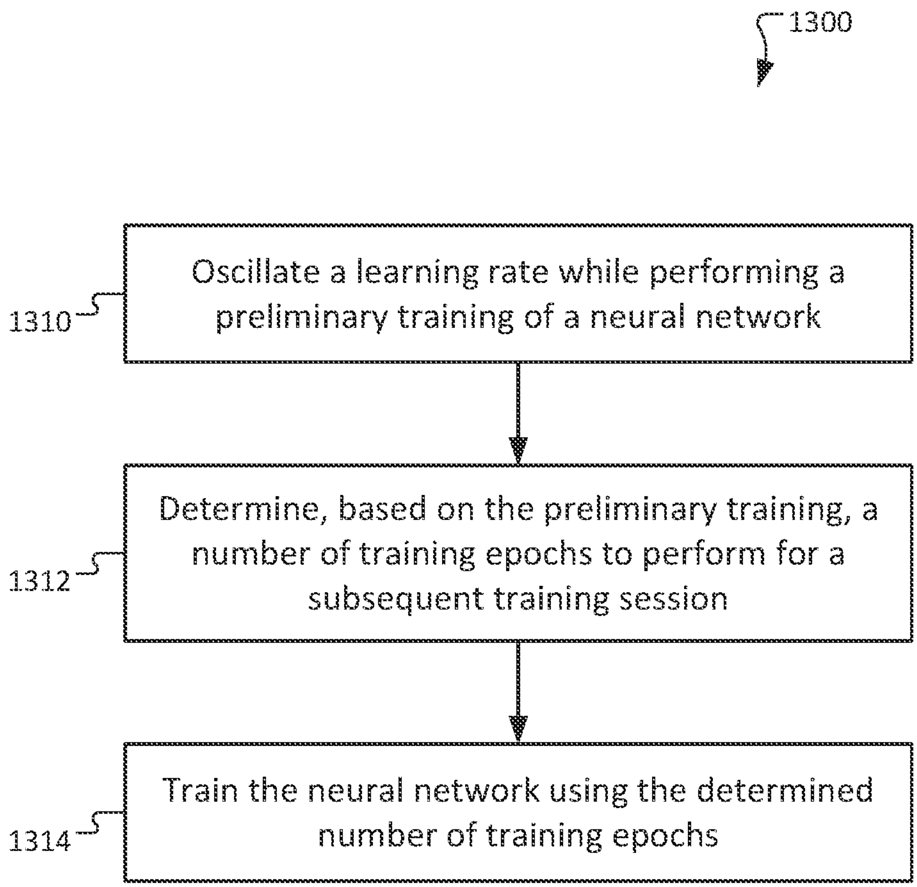
FIG. 13 is a flowchart of a method of training a neural network, in accordance with certain embodiments.

FIG. 13 is a flowchart of a method 1300 of training a neural network. A learning rate is oscillated (step 1310) while performing a preliminary training of a neural network. Based on the preliminary training, a number of training epochs to perform for a subsequent training session is determined (step 1312). The neural network is then trained (step 1314) using the determined number of training epochs.

Model Interpretation and Examples

Referring again to FIG. 2, the interpretation module 224 can be used to generate one or more tables, charts, and/or graphs that a user can access to interpret the trained model 222. Additionally or alternatively, the interpretation module 224 can receive model predictions and/or training information from the training module 214. The interpretation module 224 can use this information to generate one or more tables, charts, and/or graphs that provide a user with information related to the model training process.

Figure 14:
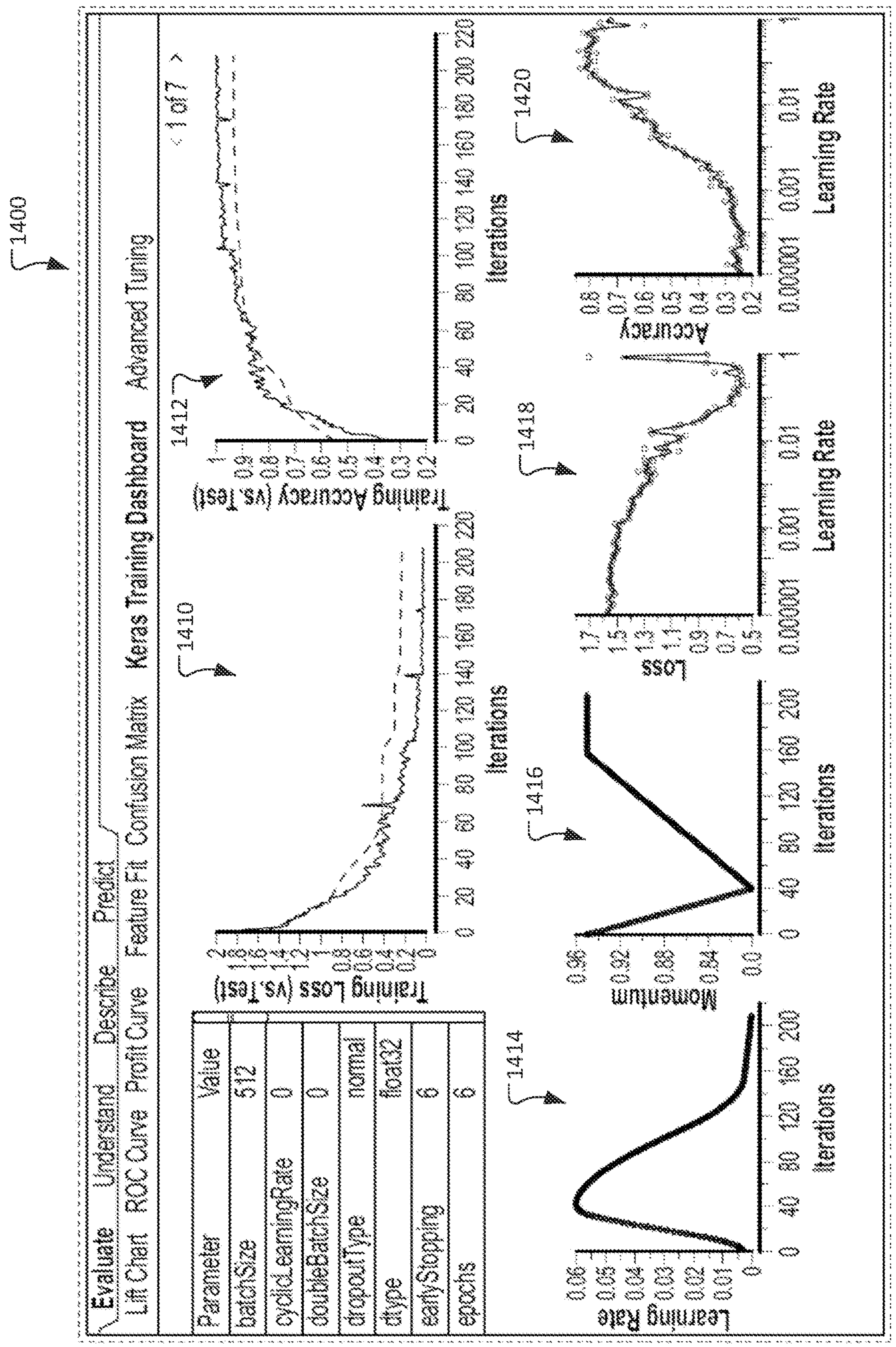
FIG. 14 is a schematic drawing of a user interface that presents information related to the training and development of a neural network model, in accordance with certain embodiments.

For example, FIG. 14 is a schematic drawing of a user interface 1400 that presents information related to the training and development of a neural network model. The user interface 1400 includes a plot 1410 of training loss vs. iterations and a plot 1412 of training accuracy vs. iterations. The plots 1410 and 1412 provide an indication of model prediction loss and accuracy during a training process, over successive iterations. The user interface 1400 also includes a plot 1414 of a learning rate schedule and a plot 1416 of a momentum schedule used for the training. The user interface 1400 also includes a plot 1418 of loss vs. learning rate and a plot 1420 of accuracy vs. learning rate. These plots 1418 and 1420 can be used determine an appropriate learning rate for training, as described herein with respect to FIG. 12.

Figure 15:
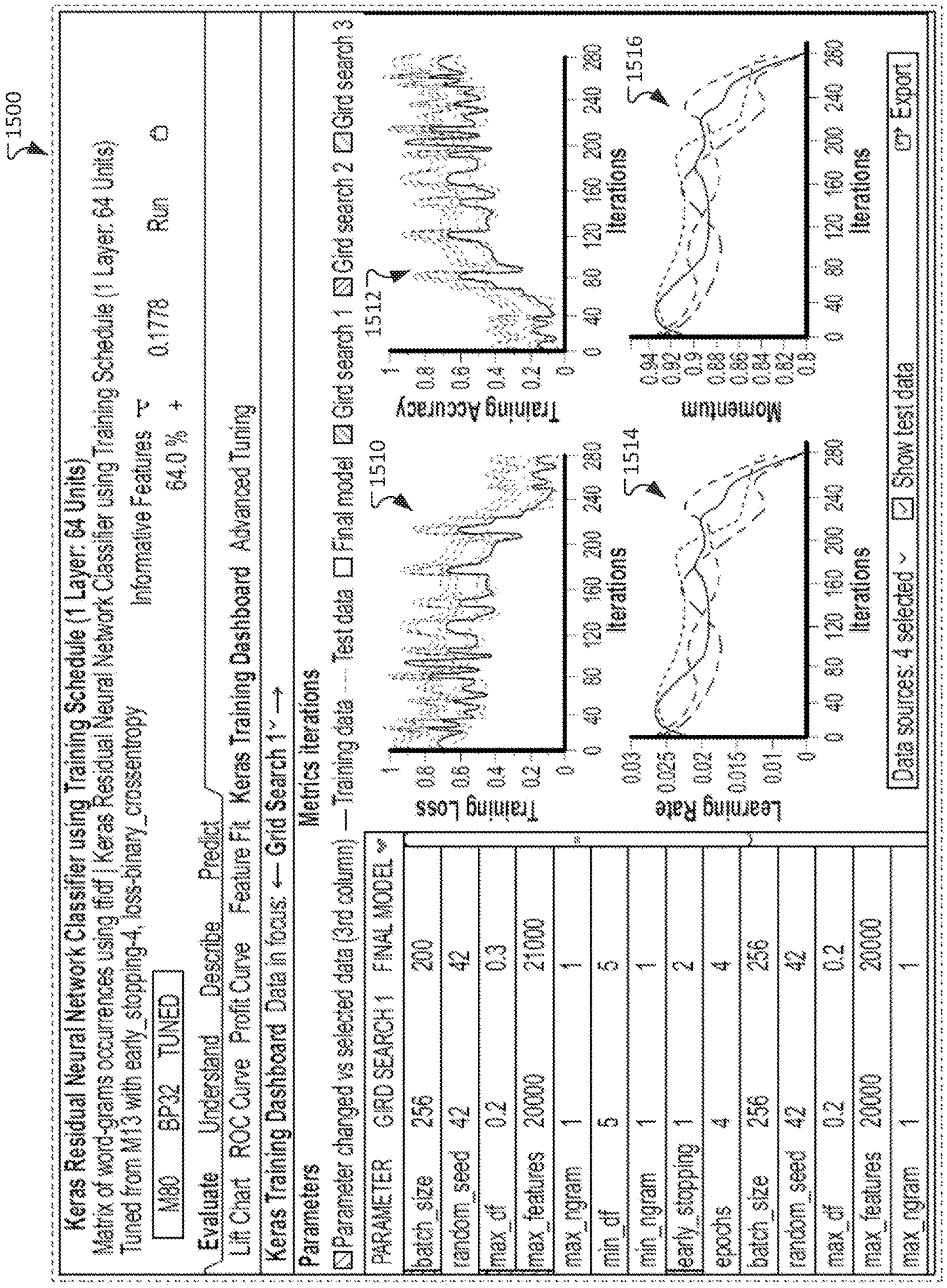
FIG. 15 is a schematic drawing of a user interface that presents information related to the training and development of multiple neural network models, in accordance with certain embodiments.

FIG. 15 is a schematic drawing of a user interface 1500 that presents information related to the training and development of multiple neural network models. The user interface 1500 includes a plot 1510 of training loss vs. iterations and a plot 1512 of training accuracy vs. iterations. The plots 1510 and 1512 provide an indication of model prediction loss and accuracy during the training of the multiple models. The user interface 1500 also includes a plot 1514 of learning rate vs. iterations and a plot 1516 of momentum vs. iterations for the models during the training.

Heterogeneous Data Applications

Previous approaches for heterogeneous data processing (e.g., processing of a dataset containing data of different, and especially multiple, types, such as numeric data, categorical data, text data, geospatial data, datetime data, image data, audio data, etc.) are generally not considered to be as readily applicable to the neural network and deep learning research space as image processing, audio processing, video processing, and natural language processing. Multi-task learning is a related area of research, but is generally applied to reinforcement learning problems, such as teaching a robotic arm multiple tasks at once. As a result, many suggested heuristics and approaches do not apply to neural networks or require significant manual adaptation. For all the aforementioned reasons, the application of neural networks to heterogeneous data is lagging behind.

Advantageously, the systems and methods described herein can be used to build neural network models that can efficiently and accurately handle heterogeneous data. The systems and methods can allow businesses and other users to: (i) quickly determine if neural network(s) should be part of the problem solution; (ii) be confident that the developed model represents a strong baseline, customized specifically to solve the problem at hand; (iii) build many diverse, performant, neural network models which can be ensembled with one another or with alternative modeling approaches—such as linear, tree, kernel, etc.—with little to no human-interaction required; and/or (iv) gain insight on what every neural network has learned in terms of feature importance, its generalizability, and be able to easily compare the developed model to other models. According to some embodiments, the systems and methods described herein can be repeated for multiple problems the business or user needs to solve. In some embodiments, the methods described herein make neural network applications to heterogenous data a low-risk, low-cost endeavor in terms of time and capital.

Computer Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 16:
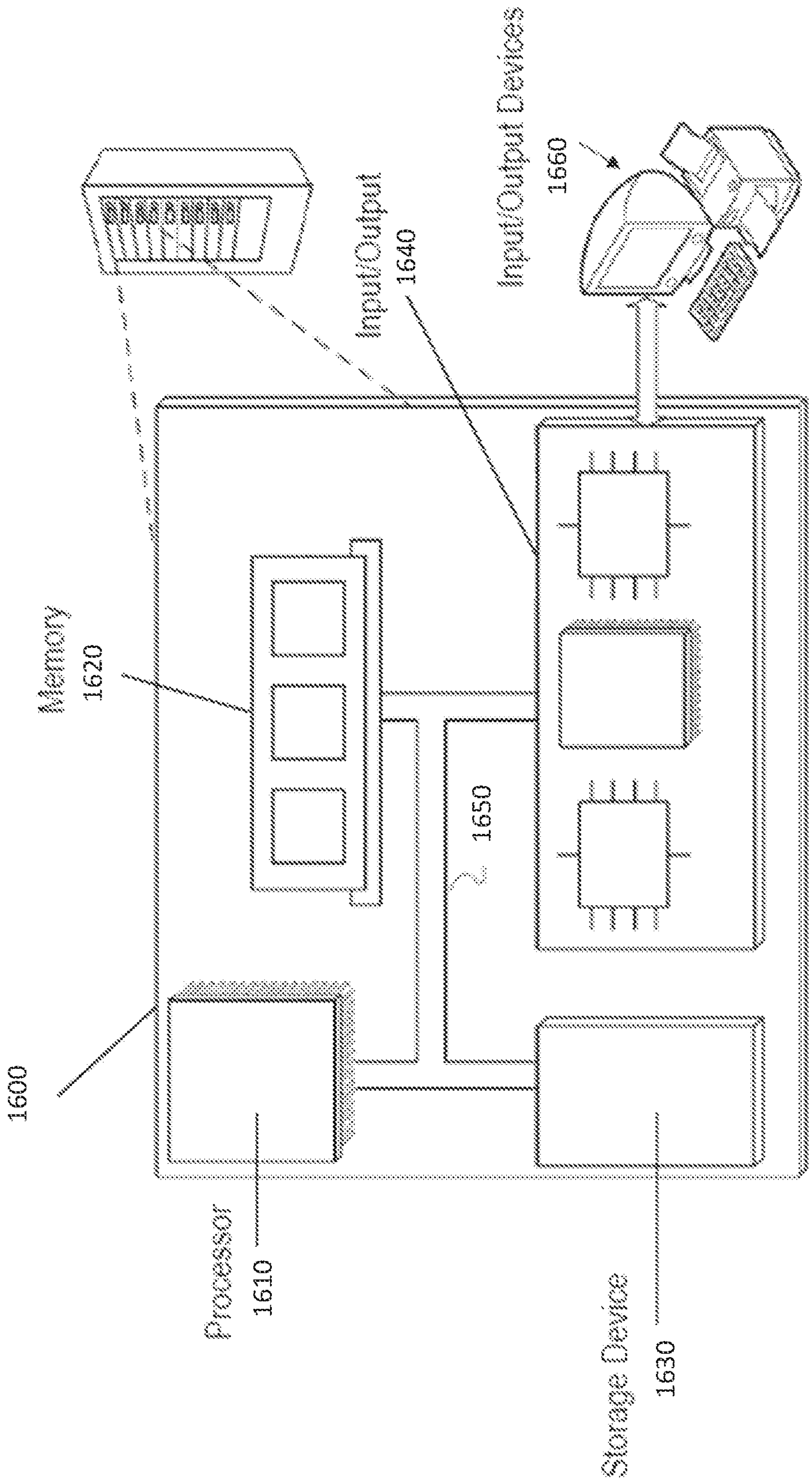
FIG. 16 is a schematic block diagram of an example computer system, in accordance with certain embodiments.

FIG. 16 is a block diagram of an example computer system 1600 that may be used in implementing the technology described in this document. General-purpose computers, network appliances, mobile devices, or other electronic systems may also include at least portions of the system 1600. The system 1600 includes a processor 1610, a memory 1620, a storage device 1630, and an input/output device 1640. Each of the components 1610, 1620, 1630, and 1640 may be interconnected, for example, using a system bus 1650. The processor 1610 is capable of processing instructions for execution within the system 1600. In some implementations, the processor 1610 is a single-threaded processor. In some implementations, the processor 1610 is a multi-threaded processor. The processor 1610 is capable of processing instructions stored in the memory 1620 or on the storage device 1630.

The memory 1620 stores information within the system 1600. In some implementations, the memory 1620 is a non-transitory computer-readable medium. In some implementations, the memory 1620 is a volatile memory unit. In some implementations, the memory 1620 is a non-volatile memory unit.

The storage device 1630 is capable of providing mass storage for the system 1600. In some implementations, the storage device 1630 is a non-transitory computer-readable medium. In various different implementations, the storage device 1630 may include, for example, a hard disk device, an optical disk device, a solid-date drive, a flash drive, or some other large capacity storage device. For example, the storage device may store long-term data (e.g., database data, file system data, etc.). The input/output device 1640 provides input/output operations for the system 1600. In some implementations, the input/output device 1640 may include one or more of a network interface devices, e.g., an Ethernet card, a serial communication device, e.g., an RS-232 port, and/or a wireless interface device, e.g., an 802.11 card, a wireless modem (e.g., 3G, 4G, or 5G). In some implementations, the input/output device may include driver devices configured to receive input data and send output data to other input/output devices, e.g., keyboard, printer and display devices 1660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1630 may be implemented in a distributed way over a network, for example as a server farm or a set of widely distributed servers, or may be implemented in a single computing device.

Although an example processing system has been described in FIG. 16, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, an engine, a pipeline, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system, comprising:

one or more processors; and at least one computer-readable medium having stored thereon executable instructions that, when executed by the one or more processors, cause the one or more processors to perform operations including:

obtaining an initial schedule of a plurality of hyperparameters of a machine learning algorithm, the initial schedule including an initial number of training iterations of a machine learning algorithm and indicating, for each training iteration in the initial number of training iterations, values of the plurality of hyperparameters during the respective training iteration, wherein the plurality of hyperparameters include a learning rate and a momentum coefficient;

adaptively training a machine learning model via application of the machine learning algorithm to the machine learning model and a training data set, wherein adaptively training the machine learning model includes:

performing a plurality of sets of training iterations of the machine learning algorithm, including, for each set of training iterations, (i) varying the values of the plurality of hyperparameters of the machine learning algorithm across the training iterations within the respective set of training iterations, wherein the varying values are based in part on the values indicated by the initial schedule, and (ii) determining an accuracy of the machine learning model corresponding to the respective set of training iterations;

determining, based on a rate of change in the determined accuracy of the machine learning model across two or more of the sets of training iterations, an adapted number of training iterations;

generating an adapted schedule of the plurality of hyperparameters based on the initial schedule and the adapted number of training iterations, the adapted schedule including the adapted number of training iterations and indicating, for each training iteration in the adapted number of training iterations, values of the plurality of hyperparameters during the respective training iteration, wherein the learning rate has a single peak throughout the adapted number of training iterations; and performing the adapted number of training iterations of the machine learning algorithm in accordance with the adapted schedule of the plurality of hyperparameters of the machine learning algorithm.

2. The system of claim 1, wherein performing a training iteration of a set of training of iterations of the plurality of sets of training iterations comprises training the machine learning model on a subset of the training data set corresponding to the training iteration.

3. The system of claim 1, wherein one or more first sets of training iterations in the plurality of sets of training iterations correspond, respectively, to a warm up phase and a general training phase of the initial schedule.

4. The system of claim 1, wherein varying the values of the plurality of hyperparameters across the training iterations within the respective set of training iterations includes:

increasing and decreasing values of the learning rate across the training iterations within the respective set of training iterations such that the learning rate peaks two or more times across the training iterations.

5. The system of claim 3, wherein a second set of training iterations of the plurality of sets of training iterations corresponds to a warm down phase of the initial schedule.

6. The system of claim 1, wherein determining the adapted number of training iterations based on the rate of change in the determined accuracy of the machine learning model across the two or more sets of training iterations comprises:

determining that a change in the determined accuracy of the machine learning model across the two or more sets of the sets of training iterations is less than a threshold value, and calculating the adapted number of training iterations based on a total number of training iterations in the two or more sets of training iterations and in any of the sets of training iterations performed prior to the two or more sets of training iterations.

7. The system of claim 1, wherein varying the values of the plurality of hyperparameters of the machine learning algorithm across the training iterations within the respective set of training iterations comprises varying values of a learning rate between a maximum value of the learning rate and a minimum value of the learning rate indicated in the initial schedule.

8. The system of claim 1, wherein generating the adapted schedule of the plurality of hyperparameters based on the initial schedule and the adapted number of training iterations comprises stretching or compressing the initial schedule based on a difference between the adapted number of training iterations and the initial number of training iterations.

9. The system of claim 1, wherein the operations further include:

providing, for presentation via a user interface, a graph of the adapted schedule indicating the values of the learning rate across the adapted number of training iterations, wherein the learning rate has the single peak throughout the adapted number of training iterations.

10. The system of claim 1, wherein operations further include:

prior to performing the adapted number of training iterations of the machine learning algorithm, updating one or more values of a first hyperparameter of the plurality of hyperparameters of the adapted schedule based on input received via a user interface.

11. A method, comprising:

obtaining, by a data processing system comprising one or more processors coupled with memory, an initial schedule of hyperparameters of a machine learning algorithm, the initial schedule including an initial number of training iterations of a machine learning algorithm and indicating, for each training iteration in the initial number of training iterations, values of the plurality of hyperparameters during the respective training iteration, wherein the plurality of hyperparameters include a learning rate and a momentum coefficient;

adaptively training, by the data processing system, a machine learning model via application of the machine learning algorithm to the machine learning model and a training data set, wherein adaptively training the machine learning model includes:

performing a plurality of sets of training iterations of the machine learning algorithm, including, for each set of training iterations, (i) varying the values of the plurality of hyperparameters of the machine learning algorithm across the training iterations within the respective set of training iterations, wherein the varying values are based in part on the values indicated by the initial schedule, and (ii) determining an accuracy of the machine learning model corresponding to the respective set of training iterations;

determining based on a rate of change in the determined accuracy of the machine learning model across two or more of the sets of training iterations, an adapted number of training iterations;

generating an adapted schedule of the plurality of hyperparameters based on the initial schedule and the adapted number of training iterations, the adapted schedule including the adapted number of training iterations and indicating, for each training iteration in the adapted number of training iterations, values of the plurality of hyperparameters during the respective training iteration, wherein the learning rate has a single peak throughout the adapted number of training iterations; and performing the adapted number of training iterations of the machine learning algorithm in accordance with the adapted schedule of the plurality of hyperparameters of the machine learning algorithm.

12. The method of claim 11, wherein performing a training iteration of a set of training of iterations of the plurality of sets of training iterations comprises training the machine learning model on a subset of the training data set corresponding to the training iteration.

13. The method of claim 11, wherein one or more first sets of training iterations in the plurality of sets of training iterations correspond, respectively, to a warm up phase and a general training phase of the initial schedule.

14. The method of claim 11, wherein varying the values of the plurality of hyperparameters across the training iterations within the respective set of training iterations includes:

increasing and decreasing values of the learning rate across the training iterations within the respective set of training iterations such that the learning rate peaks two or more times across the training iterations.

15. The method of claim 13, wherein a second set of training iterations of the plurality of sets of training iterations corresponds to a warm down phase of the initial schedule.

16. The method of claim 11, wherein determining the adapted number of training iterations based on the rate of change in the determined accuracy of the machine learning model across the two or more sets of training iterations comprises:

determining that a change in the determined accuracy of the machine learning model across the two or more sets of the sets of training iterations is less than a threshold value, and calculating the adapted number of training iterations based on a total number of training iterations in the two or more sets of training iterations and in any of the sets of training iterations performed prior to the two or more sets of training iterations.

17. The method of claim 11, wherein varying the values of the plurality of hyperparameters of the machine learning algorithm across the training iterations within the respective set of training iterations comprises varying values of a learning rate between a maximum value of the learning rate and a minimum value of the learning rate indicated in the initial schedule.

18. The method of claim 11, wherein generating the adapted schedule of the plurality of hyperparameters based on the initial schedule and the adapted number of training iterations comprises stretching or compressing the initial schedule based on a difference between the adapted number of training iterations and the initial number of training iterations.

19. A non-transitory computer-readable medium storing processor-executable instructions that, when executed by one or more processors, cause the one or more processors to perform operations including:

obtaining an initial schedule of a plurality of hyperparameters of a machine learning algorithm, the initial schedule including an initial number of training iterations of a machine learning algorithm and indicating, for each training iteration in the initial number of training iterations, values of the plurality of hyperparameters during the respective training iteration, wherein the plurality of hyperparameters include a learning rate and a momentum coefficient;

adaptively training a machine learning model via application of the machine learning algorithm to the machine learning model and a training data set, wherein adaptively training the machine learning model includes:

performing a plurality of sets of training iterations of the machine learning algorithm, including, for each set of training iterations, (i) varying the values of the plurality of hyperparameters of the machine learning algorithm across the training iterations within the respective set of training iterations, wherein the varying values are based in part on the values indicated by the initial schedule, and (ii) determining an accuracy of the machine learning model corresponding to the respective set of training iterations;

determining, based on a rate of change in the determined accuracy of the machine learning model across two or more of the sets of training iterations, an adapted number of training iterations;

generating an adapted schedule of the plurality of hyperparameters based on the initial schedule and the adapted number of training iterations, the adapted schedule including the adapted number of training iterations and indicating, for each training iteration in the adapted number of training iterations, values of the plurality of hyperparameters during the respective training iteration, wherein the learning rate has a single peak throughout the adapted number of training iterations; and performing the adapted number of training iterations of the machine learning algorithm in accordance with the adapted schedule of the plurality of hyperparameters of the machine learning algorithm.

20. The non-transitory computer-readable medium of claim 19, wherein performing a training iteration of a set of training of iterations of the plurality of sets of training iterations comprises training the machine learning model on a subset of the training data set corresponding to the training iteration.

* * * * *